US008622452B2

(12) United States Patent
Yamaguchi et al.

(10) Patent No.: US 8,622,452 B2
(45) Date of Patent: Jan. 7, 2014

(54) ROBOT AND ROBOT HAND

(75) Inventors: Yukihiro Yamaguchi, Sendai (JP);
Kazuhiro Kosuge, Sendai (JP);
Yasuhisa Hirata, Sendai (JP); Kengo Yamaguchi, Sendai (JP); Aya Kaisumi, Sendai (JP)

(73) Assignee: Seiko Epson Corporation (JP)

(*) Notice: Subject to any disclaimer, the term of this patent is extended or adjusted under 35 U.S.C. 154(b) by 78 days.

(21) Appl. No.: 13/331,041

(22) Filed: Dec. 20, 2011

(65) Prior Publication Data
US 2012/0153652 A1    Jun. 21, 2012

(30) Foreign Application Priority Data

Dec. 21, 2010 (JP) ................................. 2010-285076

(51) Int. Cl.
*B25J 15/08* (2006.01)

(52) U.S. Cl.
USPC .............................. 294/106; 294/902; 901/39

(58) Field of Classification Search
USPC ..................... 294/86.4, 106, 213, 902; 901/39
See application file for complete search history.

(56) References Cited

U.S. PATENT DOCUMENTS

| | | | |
|---|---|---|---|
| 4,478,451 A * | 10/1984 | Brucher et al. | 294/106 |
| 4,505,636 A * | 3/1985 | Sugino et al. | 414/736 |
| 4,565,400 A * | 1/1986 | Nakashima et al. | 294/197 |
| 4,647,100 A * | 3/1987 | Lessway | 294/119.1 |
| 4,784,422 A * | 11/1988 | Jones et al. | 294/106 |
| 4,819,978 A | 4/1989 | Scheinman et al. | |
| 5,200,679 A | 4/1993 | Graham | |
| 6,217,094 B1 | 4/2001 | Hanaduka et al. | |
| 6,234,487 B1 | 5/2001 | Shoemaker, Jr. | |
| 2012/0065779 A1 | 3/2012 | Yamaguchi et al. | |
| 2012/0065780 A1 | 3/2012 | Yamaguchi et al. | |

FOREIGN PATENT DOCUMENTS

| | | |
|---|---|---|
| JP | 2009-078312 | 4/2009 |
| WO | 99-48651 | 9/1999 |

OTHER PUBLICATIONS

Extended European Search Report for Application No. 11 19 4259 mailed on Mar. 22, 2012 (6 pages).

* cited by examiner

*Primary Examiner* — Dean Kramer
(74) *Attorney, Agent, or Firm* — Harness, Dickey & Pierce, P.L.C.

(57) ABSTRACT

A recess has a proximal-end-side surface and a distal-end-side surface. When an intersection between a straight line included in the proximal-end-side surface and a straight line included in the distal-end-side surface is a base point, a line passing through the base point is a base line, a line between two claw portions, passing through an end point of the recess and orthogonal to the base line is an orthogonal line, the angle α made between the base line, and the straight line included in the distal-end-side surface is greater than 0 degrees and less than 90 degrees, the angle β made between the orthogonal line, and the straight line included in the proximal-end-side surface is greater than 0 degrees and less than 90 degrees, and the length d from the base point to the orthogonal line is greater than 0.

14 Claims, 23 Drawing Sheets

PARAMETERS
OF GRIP CLAW TIP SHAPE

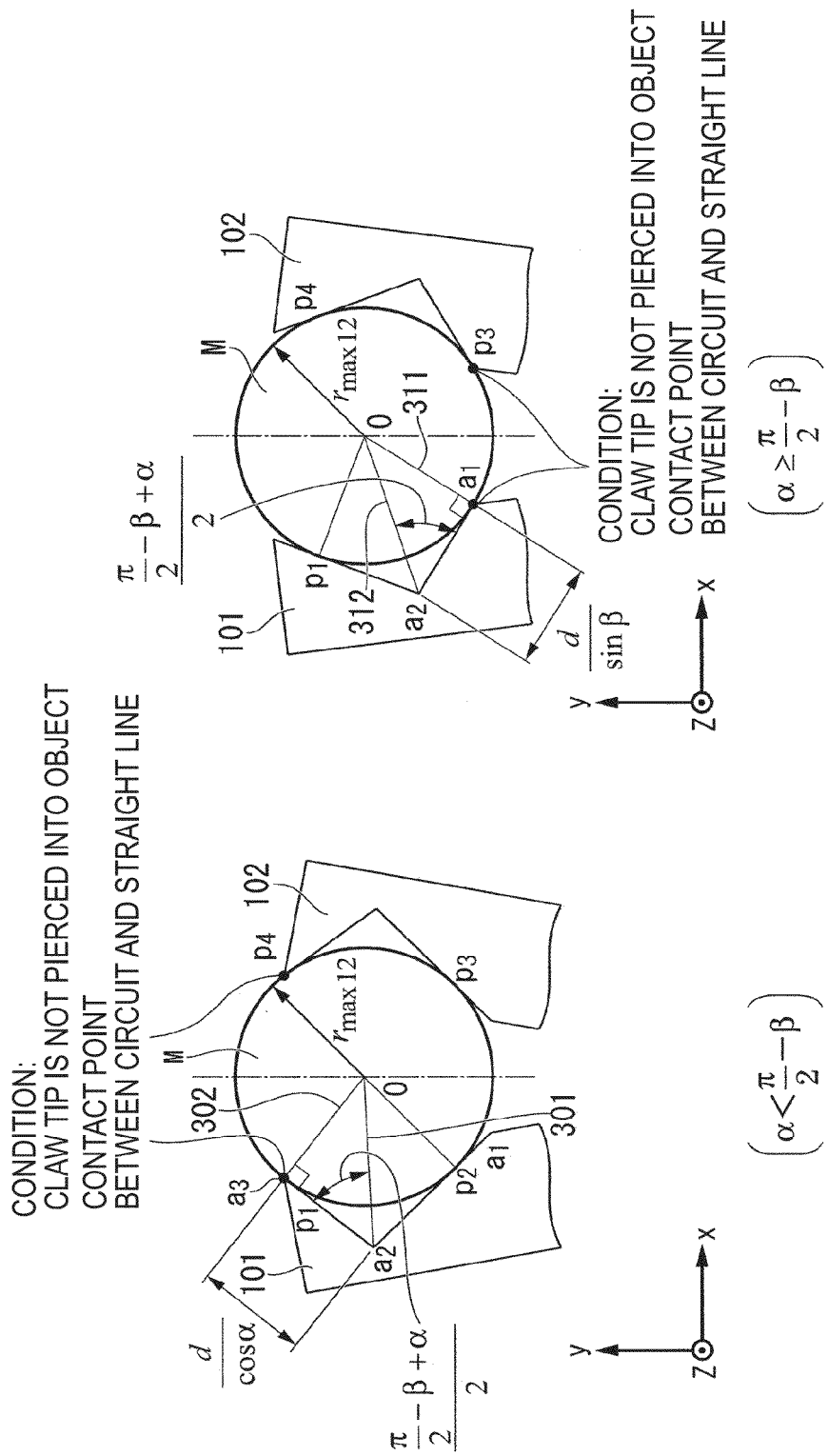

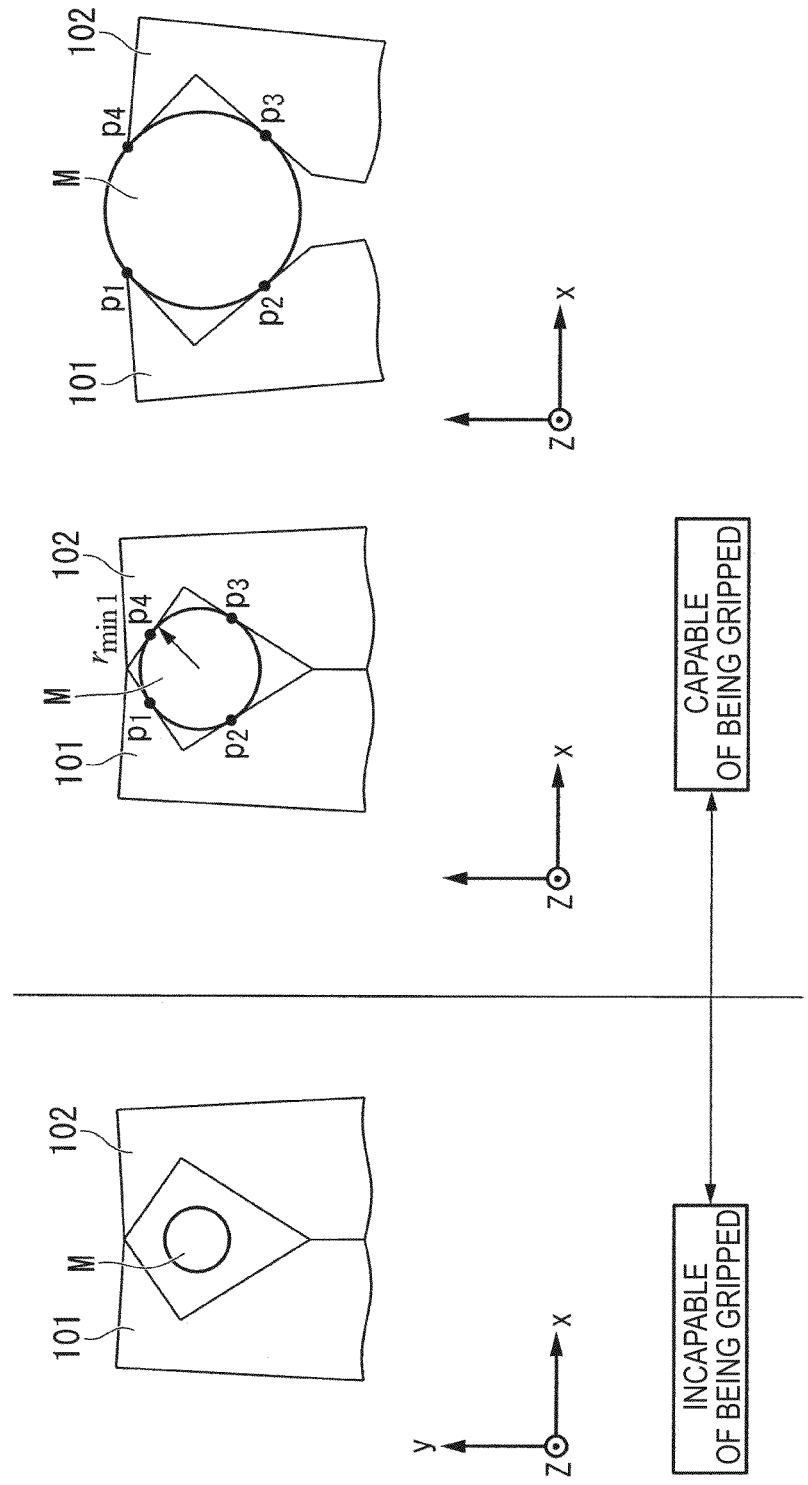

CAGING CONDITION: $r_{max\,2}$

SMALLER ONE OF VALUES OF INTERSECTIONS OF BETWEEN $C_1$ AND $C_2$ IS $r_{max2}$ $\mu < \tan\phi$    $\mu$: FRICTIONAL COEFFICIENT
$\phi > \tan^{-1}\mu$    $\phi$: CONTACT ANGLE $\mu < \tan\phi$    $\mu$: FRICTIONAL COEFFICIENT
$\phi > \tan^{-1}\mu$    $\phi$: CONTACT ANGLE

UPWARD SELF-ALIGNMENT

DOWNWARD SELF-ALIGNMENT

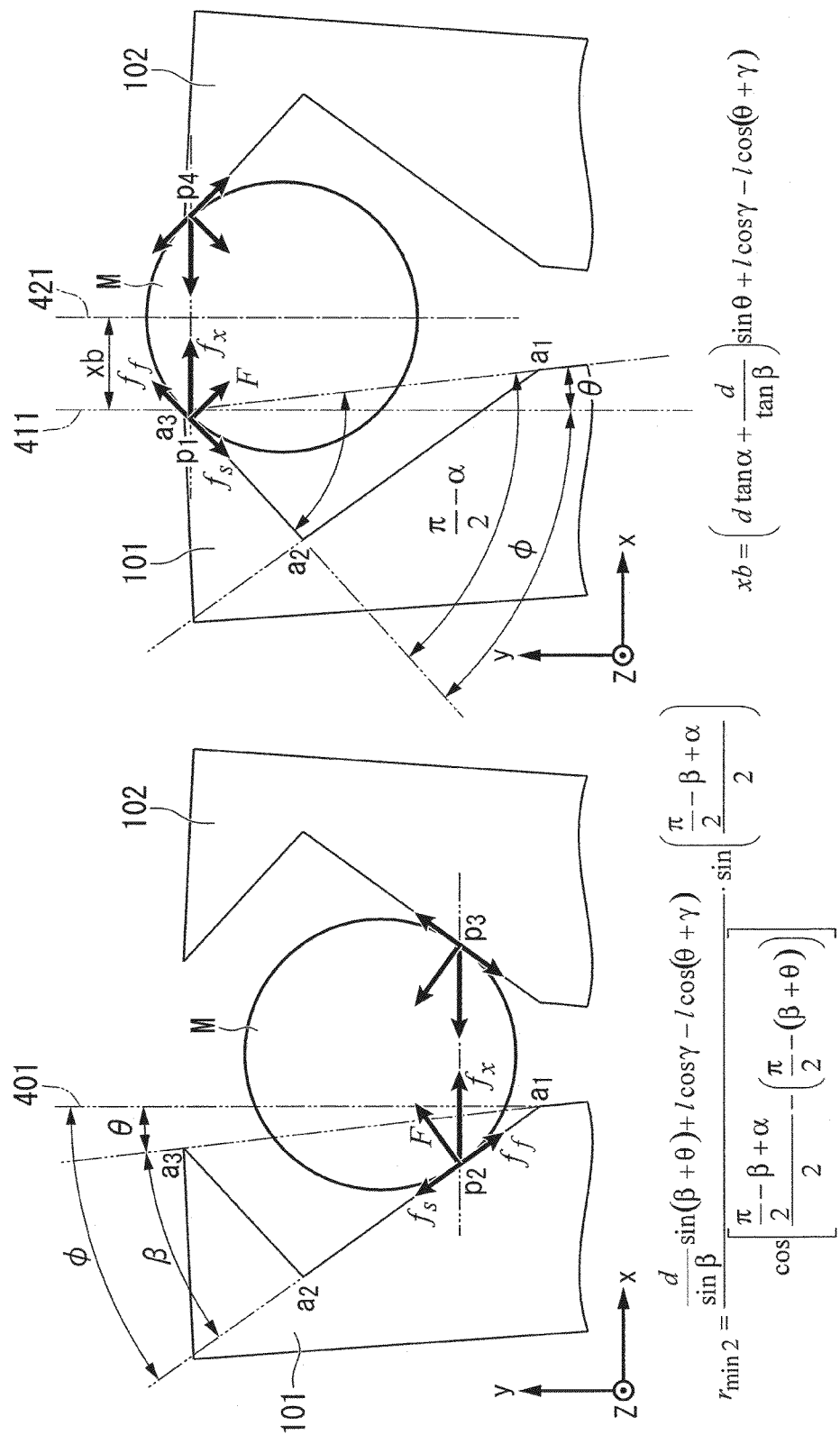

$$x = \frac{d}{\sin \beta} \sin(\beta + \theta) + l\cos\gamma - l\cos(\theta + \gamma)$$

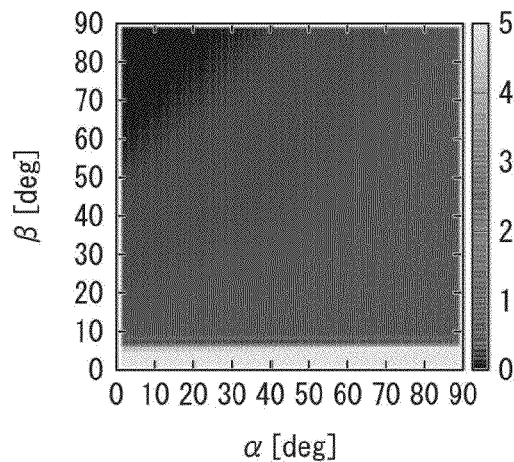
FIG.23A  $d = 1.0\ mm$
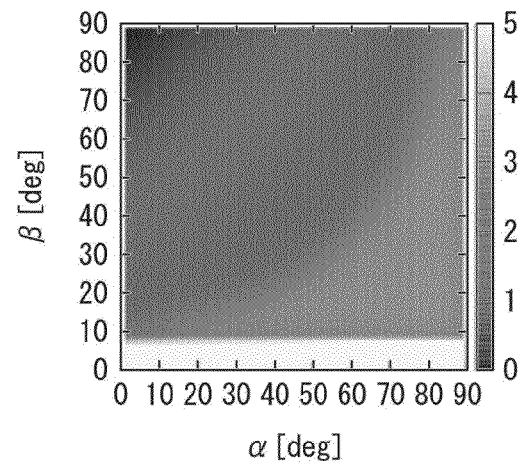
FIG.23B  $d = 3.0\ mm$
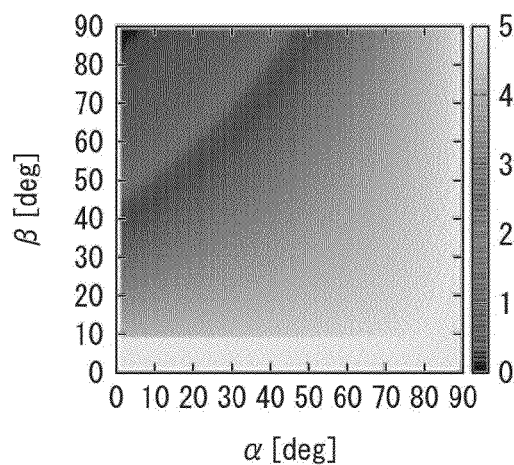
FIG.23C  $d = 5.0\ mm$
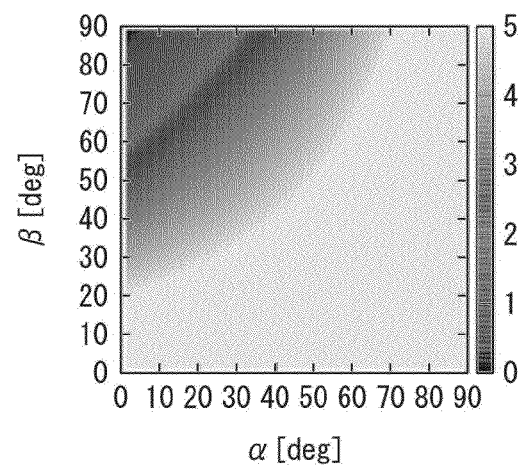
FIG.23D  $d = 7.0\ mm$

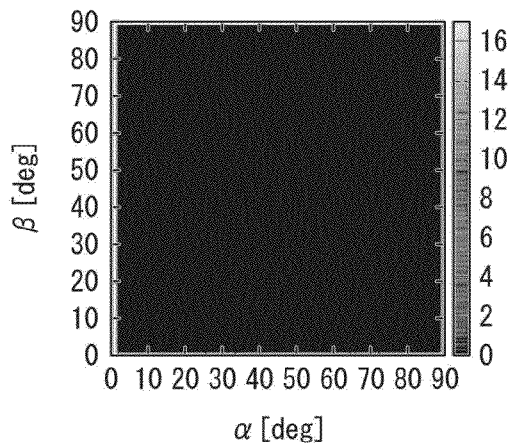
FIG.24A  $d = 1.0\ mm$
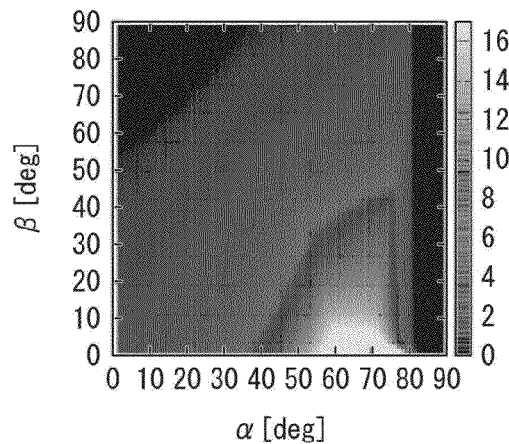
FIG.24B  $d = 3.0\ mm$
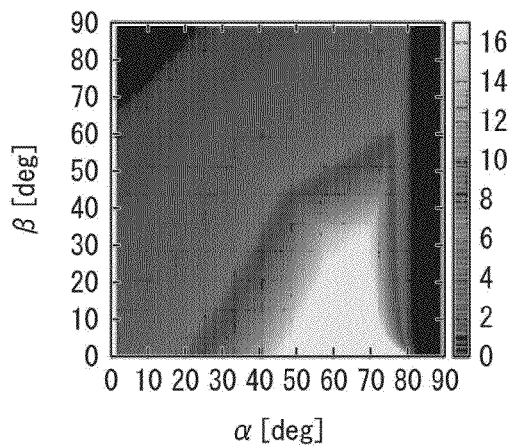
FIG.24C  $d = 5.0\ mm$
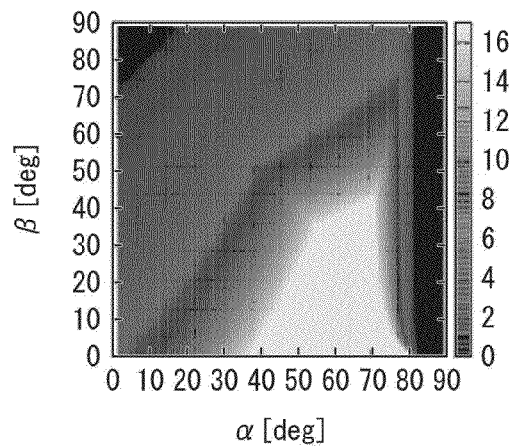
FIG.24D  $d = 7.0\ mm$

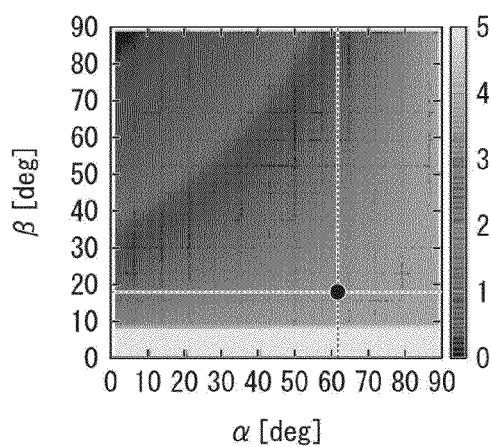
FIG.25A  *Minimum Size (d = 4.1mm)*
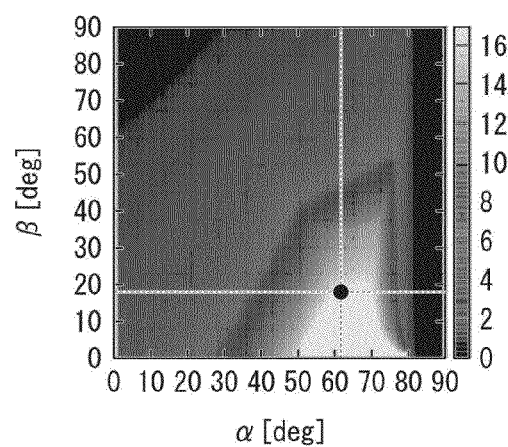
FIG.25B  *Max Size (d = 4.1mm)*

- CLAW TIP SHAPE
  - $d$ : 4.1[mm]
  - $\alpha$ : 61.8[deg]
  - $\beta$ : 18.4[deg]
- GRIPPABLE RANGE
  - DIAMETER 9.3mm ~ 33.5mm

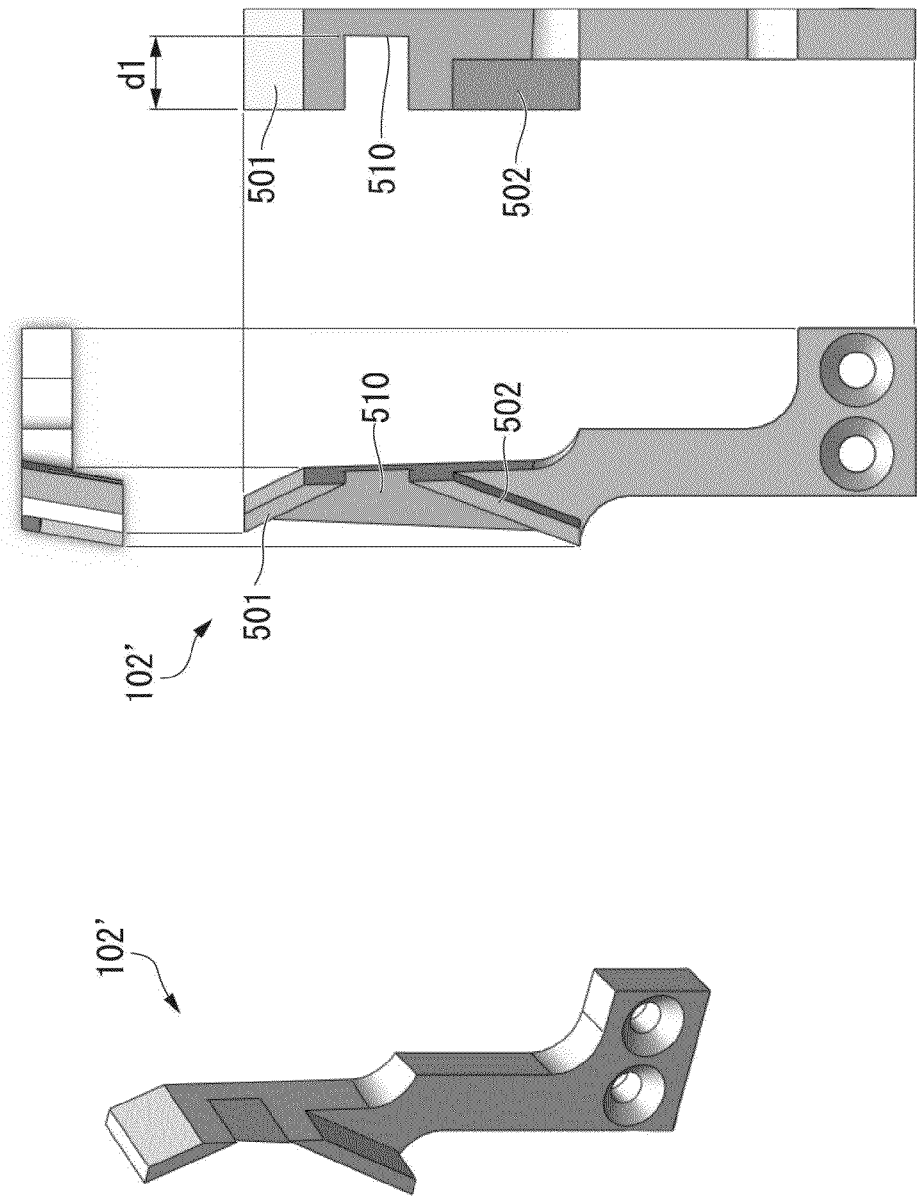

ROBOT AND ROBOT HAND

BACKGROUND

1. Technical Field

The invention relates to a robot and a robot hand.

2. Related Art

In recent years, SCARA robots, multi-axis robots, or the like are used for assembly, inspection, or the like of products in manufacturing sites or the like. In a case where an object is carried when the assembly or inspection of products is performed, a robot suctions the object or grips the object with an arm.

In such an industrial robot, it is required that objects which take an unspecified variety of postures should be efficiently gripped in a predetermined posture in automatic assembling and other working processes. For example, in the robot of JP-A-2009-78312, a chucking mechanism which grips an object is allowed to be normally and reversely rotated around a central axis which supports a chuck itself by a rotating mechanism, and the rotating mechanism itself is made rotatable in a downward predetermined angle range by an oscillating mechanism.

However, in the invention described in JP-A-2009-78312, if an object is small and lightweight, it becomes difficult to precisely detect the position and posture of the object using a camera. As a result, there is a case where the chucking mechanism which grips the object cannot be precisely positioned. If the chucking mechanism cannot be precisely positioned, there is a possibility that the object comes into contact with the chucking mechanism in an unintended place during the gripping operation. In that case, since the object is lightweight, the object may move in an unintended direction. Thus, there is a case where the object cannot be held at a desired position, or the object may jump out of a gripping space.

Additionally, in the invention described in JP-A-2009-78312, in the case of parts having greatly different sizes as the objects, it is necessary to replace a chucking mechanism according to the size of the parts.

SUMMARY

An advantage of some aspects of the invention is to provide a robot and a hand for a robot which reliably grips an object.

An aspect of the invention is directed to a robot including two claw portions which face each other and which each have a recess formed in the corresponding surfaces, which grips an object with the recess as each of the claw portions rocks with a proximal end which is a rocking axis. The recess of each of the claw portions has a proximal-end-side surface and a distal-end-side surface between a distal end portion of the claw portion and the rocking axis. When the claw portion is seen in an axial direction of the rocking axis, a point where a straight line including the proximal-end-side surface intersects a straight line including the distal-end-side surface is a base point, and a line passing through the base point is a base line. When a line passing through an inner end point in a rocking direction at an edge line of the proximal-end-side surface, and orthogonal to the base line is an orthogonal line, an angle α of a corner made between the base line and the straight line including the distal-end-side surface is greater than 0 degrees and less than 90 degrees, an angle β of a corner made between the orthogonal line and the straight line including the proximal-end-side surface is greater than 0 degrees and less than 90 degrees, and the length d of the base line from the base point to the orthogonal line is greater than 0.

According to the aspect of the invention, the recess of each of the claw portions has a proximal-end-side surface and a distal-end-side surface, and the proximal-end-side surface and the distal-end-side surface are formed such that the angle α formed by the base line, and an extension line of the end edge of the distal-end-side surface is less than 90 degrees, the angle β formed by the orthogonal line, and an extension line of the end edge of the proximal-end-side surface is less than 90 degrees, and the length d of the base line from the base point to the orthogonal line is greater than 0. Thus, it is possible to provide a robot which reliably grips an object.

The robot of the aspect of the invention may be configured such that, when the claw portion is seen in the axial direction of the rocking axis, the recess is formed in such a relationship that the difference between the minimum value and maximum value of the radius r of the object is the maximum on the basis of the angle α, the angle β, and the length d.

According to this configuration, the recess is set such that the variation of the radius r of a columnar object becomes the maximum, on the basis of the angle α formed by the base line, and the extension line of the end edge of the distal-end-side surface, the angle β formed by the orthogonal line, and the extension line of the end edge of the proximal-end-side surface, and the length d of the base line from the base point to the orthogonal line. Thus, it is possible to provide a robot which reliably grips an object.

The robot of the aspect of the invention may be configured such that, when the claw portion is seen in the axial direction of the rocking axis, the recess is formed in such a relationship that the difference between the minimum value and maximum value of the radius r of the object is the maximum, on the basis of the length l from the rocking axis to the end of the proximal-end-side surface on a rocking axis side, the angle γ of a corner made between the base line and a straight line passing through the end when each of the claw portions is closed, and the angle θ of a corner made between a straight line passing through the end from the rocking axis when each of the claw portions is opened and a straight line passing through the end from the rocking axis when each of the claw portions is closed.

According to this configuration, the recess is set such that the variation of the radius r of a columnar object becomes the maximum, on the basis of the length l from the rocking axis to the endpoint of the proximal-end-side surface of the claw portion which does not intersect the distal-end-side surface, the angle γ made between the base line when each of the claw portions is closed, and the angle θ made between the end point from the rocking axis when each of the claw portions is opened and the endpoint from the rocking axis when each of the claw portions is closed. Thus, it is possible to provide a robot which reliably grips an object.

The robot of the aspect of the invention may be configured such that, when the length d and the angles α and β are determined to be arbitrary values, as the conditions of the object capable of being gripped, the minimum value $r_{min}$ of the radius of the object capable of being gripped which is a value of any greater radius is determined from the minimum value $r_{min1}$ of the radius of the object capable of being gripped in contact with the proximal-end-side surface and distal-end-side surface of each of the claw portions when the object is gripped at four points, and the minimum value $r_{min2}$ of the radius of the object capable of being gripped in contact with the proximal-end-side surface and distal-end-side surface of each of the claw portions as the object deviates due to the rocking of each of the claw portions even if the object comes in contact with only the distal-end-side surface of the recess of each of the claw portions when the object is gripped by each of the claw portions, and the recess is formed in the relationship between the arbitrarily determined length d and angles α and β, and the minimum value $r_{min}$ of the radius of the object.

According to this configuration, each claw portion is formed in such a shape that the minimum value of the radius of an object satisfies frictional grip conditions, and conditions capable of self-alignment. Thus, it is possible to provide a robot which reliably grips an object.

The robot of the aspect of the invention may be configured such that, when the length d and the angles α and β are determined to arbitrary values, as the conditions of the object capable of being gripped, the maximum value $r_{max}$ of the radius of the object which is the value of the smallest radius is determined from the maximum value $r_{max1}$ of the radius of the object capable of being gripped in contact with the proximal-end-side surface and distal-end-side surface of each of the claw portions when the object is gripped at four points, the maximum value $r_{max2}$ of the radius of the object in which the object is movable without being constrained by the proximal-end-side surface and distal-end-side surface of the recess of each of the claw portions when the object is gripped by each of the claw portions, and a region where the center of the object is movable is the maximum, and the maximum value $r_{max3}$ of the radius of the object capable of being gripped in contact with the proximal-end-side surface and distal-end-side surface of each of the claw portions as the object deviates due to the rocking of each of the claw portions even if the object comes in contact with only the proximal-end-side surface of the recess of each of the claw portions when the object is gripped by each of the claw portions, and the shape of the recess is formed in the relationship between the arbitrarily determined length d and angles α and β, and the maximum value $r_{max}$ of the radius of the object.

According to this configuration, each claw portion is formed in such a shape that the maximum value of the radius of an object satisfies frictional grip conditions, conditions that the center of the object moves freely, and conditions capable of self-alignment. Thus, it is possible to provide a robot which reliably grips an object.

The robot of the aspect of the invention may be configured such that, when the object is gripped at four points so as to come in contact with the proximal-end-side surface and distal-end-side surface of each of the claw portions, the recess is formed in such a relationship that the centerline of the object is present between a first line connecting a first contact point between the distal-end-side surface of one of the claw portions, and the object, and a second contact point between the distal-end-side surface of the other claw portion, and the object, and a second line connecting a third contact point between the proximal-end-side surface of one of the claw portions, and the object, and a fourth contact point between the proximal-end-side surface of the other claw portion and the object.

According to this configuration, each claw portion is formed so as to satisfy frictional grip conditions. Thus, it is possible to provide a robot which reliably grips and carries an object while preventing an object to be gripped from jumping out of the claw portion.

The robot of the aspect of the invention may be configured such that the recess is formed on the basis of the shape of the region where the center of the object is movable.

According to this configuration, each claw portion is formed in such a shape capable of caging an object. Thus, it is possible to provide a robot which reliably grips and carries an object.

The robot of the aspect of the invention may be configured such that each of the claw portions is formed so as not to interfere with a part which is a target to which the object is assembled.

According to this configuration, each claw portion is formed so as not to interfere with a part which is a target to which the object is assembled, on the basis of the size of the object, and the size of a part which is a target to which the object is assembled. Thus, it is possible to provide a robot which reliably grips and carries an object without interfering with a part which is a target to which the object is assembled.

In the robot of the aspect of the invention, the recess may be formed such that the relationship between the minimum value $r_{min1}$ of the radius of the object, and the length d, and angles α and β satisfies the following formula:

$$r_{min1} = \frac{d\cos(\alpha - \beta)}{\cos\alpha + \sin\beta}$$

the relationship between the minimum value $r_{min2}$ of the radius of the object, and the lengths d and l, and angles α, β, γ, and θ satisfies the following formula:

$$r_{min2} = \left(\frac{d\sin(\beta + \theta)}{\sin\beta} + l\cos\gamma - l\cos(\theta + \gamma)\right) \times \frac{\sin\left(\frac{\frac{\pi}{2} - \beta + \alpha}{2}\right)}{\cos\left(\frac{\frac{\pi}{2} - \beta + \alpha}{2} - \left(\frac{\pi}{2} - (\beta + \theta)\right)\right)}$$

where the minimum value $r_{min2}$ of the radius of the object is 0 when $\phi_{lim}$, is greater than β, the relationship between the maximum value $r_{max1}$ of the radius of the object, and the lengths d and l and angles α, β, and γ satisfies the smaller one of the following formula:

$$r_{max11} = \frac{d}{\sin\beta}\cos(\alpha - \beta) + l\cos\gamma + l\sin(\gamma - \alpha)$$

and the following formula:

$$r_{max12} = \frac{d}{\cos\alpha}\tan\left(\frac{\frac{\pi}{2} - \beta + \alpha}{2}\right)$$

where the following formula is satisfied when α is equal to or less than π/2−β:

$$r_{max12} = \frac{d}{\sin\beta}\tan\left(\frac{\frac{\pi}{2} - \beta + \alpha}{2}\right)$$

the relationship between the maximum value $r_{max2}$ of the radius of the object, and the lengths d and l, and angles α, β, γ, and θ satisfies the following formula:

$$r_{min2} = \left(\frac{d\sin(\beta+\theta)}{\sin\beta} + l\cos\gamma - l\cos(\theta+\gamma)\right) \times \frac{\sin\left(\frac{\frac{\pi}{2}-\beta+\alpha}{2}\right)}{\cos\left(\frac{\frac{\pi}{2}-\beta+\alpha}{2} - \left(\frac{\pi}{2}-(\beta+\theta)\right)\right)}$$

where the minimum value $r_{min2}$ of the radius of the object is 0 when $\phi_{lim}$ is greater than $\beta$, the relationship between the maximum value $r_{max3}$ of the radius of the object, and the length d, and angles $\alpha$ and $\beta$ satisfies the following formula:

$$r_{max3} = \frac{\left(d\tan\alpha + \frac{d}{\tan\beta}\right)\cos\left(\frac{\pi}{2}-\theta\right)}{\cos\left(\frac{\pi}{2}-\alpha-\theta\right)} + \frac{l\cos\gamma - l\sin\left(\frac{\pi}{2}-\theta-\gamma\right)}{\cos\left(\frac{\pi}{2}-\alpha-\theta\right)}$$

where $r_{max3}$ is 0 (here, $\phi_{lim}$ is $\beta+\theta$) when $\phi_{lim}$ is greater than $\pi/2-\alpha$.

According to this configuration, the shape of the recess is designed such that the relationship between the minimum value $r_{min1}$ of the radius of the object, and the length d, and the angles $\alpha$ and $\beta$, the relationship between the minimum value $r_{min2}$ of the radius of the object, and the length d and the angles $\alpha$ and $\beta$, the relationship between the maximum value $r_{max1}$ of the radius of the object, and the lengths d, l and the angles $\alpha$, $\beta$, and $\gamma$, the relationship between the maximum value $r_{max2}$ of the radius of the object, and the lengths d and l, and angles $\alpha$, $\beta$, $\gamma$, and $\theta$, the relationship between the maximum value $r_{max3}$ of the radius of the object, and the length d, and the angles $\alpha$ and $\beta$ become relationships similar to the formulas, respectively. Thus, it is possible to provide a hand for a robot which reliably grips an object.

The robot of the aspect of the invention may be configured such that the object includes a columnar shape.

According to this configuration, it is possible to provide a hand for a robot which reliably grips a part including a columnar shape as the object.

The robot of the aspect of the invention may be configured to include a gear-like shape.

According to this configuration, it is possible to provide a hand for a robot which reliably grips a gear-like part, such as a spur gear, as the object.

Another aspect of the invention is directed to a hand for a robot including two claw portions which face each other and which each have a recess formed in the corresponding surfaces, which pinches an object with the recess as each of the claw portions rocks with a proximal end which is a rocking axis. The recess of each of the claw portions has a proximal-end-side surface and a distal-end-side surface between a distal end portion of the claw portion and the rocking axis. When the claw portion is seen in an axial direction of the rocking axis, a point where a straight line including the proximal-end-side surface intersects a straight line including the distal-end-side surface is a base point, and a line passing through the base point is a base line. When a line passing through an inner end point in a rocking direction at an edge line of the proximal-end-side surface, and orthogonal to the base line is an orthogonal line, the angle $\alpha$ of a corner made between the base line, and the straight line including the distal-end-side surface is greater than 0 degrees and less than 90 degrees, the angle $\beta$ of a corner made between the orthogonal line, and the straight line including the proximal-end-side surface is greater than 0 degrees and less than 90 degrees, and the length d of the base line from the base point to the orthogonal line is greater than 0.

According to the aspect of the invention, the recess of each of the claw portions has a proximal-end-side surface and a distal-end-side surface, and the proximal-end-side surface and the distal-end-side surface are formed such that the angle $\alpha$ formed by the base line, and an extension line of the end edge of the distal-end-side surface is less than 90 degrees, the angle $\beta$ formed by the orthogonal line, and an extension line of the end edge of the proximal-end-side surface is less than 90 degrees, and the length d of the base line from the base point to the orthogonal line is greater than 0. Thus, it is possible to provide a hand for a robot which reliably grips an object.

BRIEF DESCRIPTION OF THE DRAWINGS

The invention will be described with reference to the accompanying drawings, wherein like numbers reference like elements.

FIGS. 8A and 8B are views illustrating the relationship between the apexes of the grip claws and a part, related to the present embodiment.

FIGS. 9A to 9C are views illustrating the size of a part capable of being gripped when the grip claws related to the present embodiment are closed.

FIGS. 19A and 19B are views illustrating a force applied to a part from the grip claws related to the present embodiment.

FIGS. 23A to 23D are views showing examples of the results when the minimum size $r_{min}$ of the part M related to the present embodiment is calculated.

FIGS. 24A to 24D are views showing examples of the results when the maximum size $r_{max}$ of the part M related to the present embodiment is calculated.

FIGS. 25A and 25B are views showing examples of the calculation results of the values of $\alpha$ and $\beta$ in a case where d related to the present embodiment is 4.1 mm.

FIGS. 27A and 27B are views illustrating another design example of the grip claw related to the present embodiment.

DESCRIPTION OF EXEMPLARY EMBODIMENTS

An embodiment of the invention will be described in detail with reference to the accompanying drawings. In addition, the invention is not limited to this embodiment, and various modifications can be made within the scope of the technical idea of the invention. Additionally, in the following drawings, scales, numbers, or the like in the actual structure and each structure are made different from each other in order to make the respective components easily understood.

In the following description, respective members will be described, referring to an XYZ orthogonal coordinate system shown in FIG. 1. In the XYZ orthogonal coordinate system, the X-axis and the Y-axis are set in directions parallel to the horizontal surface and orthogonal to each other, and the Z-axis is set in a direction (vertical direction) orthogonal to the X-axis and the Y-axis, respectively.

Figure 1:
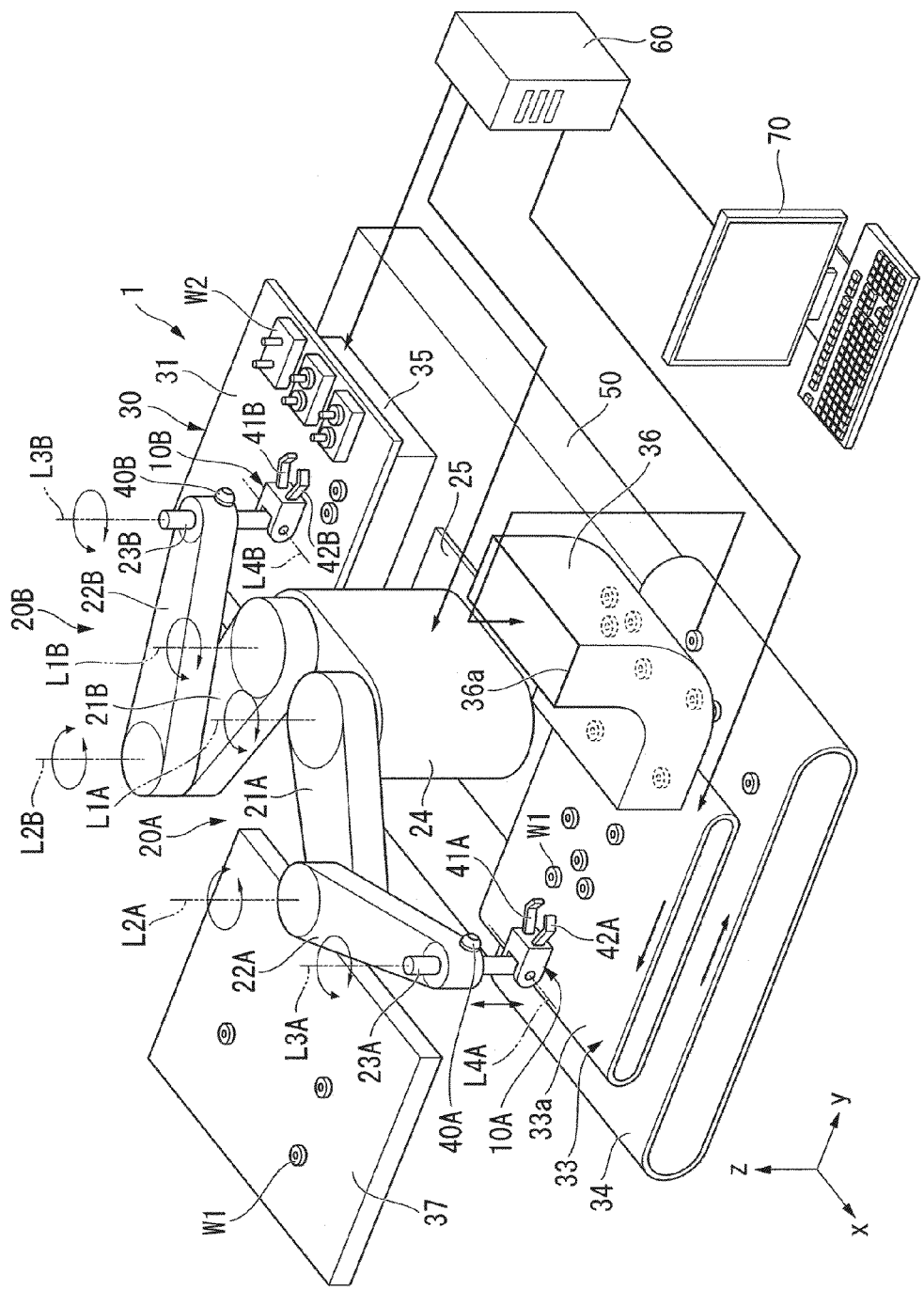
FIG. 1 is a perspective view showing the schematic configuration of a robot related to the present embodiment.

FIG. 1 is a perspective view showing the schematic configuration of a robot 1 related to the present embodiment. In FIG. 1, an object marked with W1 is a first object, and an object marked with W2 is a second object. Additionally, an object marked with L1A is a rotating shaft of a first arm 21A, an object marked with L2A is a rotating shaft of a second arm 22A, an object marked with L3A is a rotating shaft of a third arm 23A, and an object marked with L4A is a rotating shaft of a grip portion 10A. An object marked with L1B is a rotating shaft of a first arm 21B, an object marked with L2B is a rotating shaft of a second arm 22B, an object marked with L3B is a rotating shaft of a third arm 23B, and an object marked with L4B is a rotating shaft of a grip portion 10B.

Here, description will be made by illustrating a small and lightweight gear (also referred to as a spur gear) as the first object W1. Description will be made by illustrating an electronic device including a supporting shaft (pin) which rotatably supports a gear as the second object W2. In addition, the first object W1 is formed in a substantially columnar shape having a curved surface on the side where the first object W1 comes in contact with the grip portion. In addition, the "small" means that, for example, the diameter of an object is 10 [mm] to 30 [mm]. Additionally, the lightweight means that, for example, the weight of an object is several grams to several tens of grams. Additionally, the first object W1 may be a washer, a pulley, or the like having a substantially columnar shape.

As shown in FIG. 1, the robot 1 related to the present embodiment includes the grip portions 10A and 10B which open and close a pair of finger portions to grip an object, arms (moving device) 20A and 20B which relatively moves an object and the grip portions 10A and 10B, respectively, conveyor belts 33 and 34 which transport the first object W1, a feeder 36 which carries in the first object W1 to the first conveyor belt (moving device) 33, a stage 37 which becomes a platform for transfer of the first object W1, a stage (moving device) 30 which allows the objects W1 and W2 to be placed thereon, a base 50 which supports the arms 20A and 20B, a main shaft 24, and the stage 30, cameras 40A and 40B attached to the arms 20A and 20B, respectively, a control device 60 which controls the operation of the robot 1 itself, and an input device 70 which performs an input instruction to the control device 60.

The grip portion 10A is linked to the distal end portion of the third arm 23A. The grip portion 10A grips the first object W1 placed on the first conveyor belt 33. The grip portion 10A transports the gripped first object W1 to the stage 37. The grip portion 10A includes a detecting device 42A which detects a force which grips the first object W1. As the detecting device 42A, for example, a pressure sensor is used, or a sensor which detects a change (a change in a current which flows through a motor) in the torque of a motor is used.

The grip portion 10B is linked to the distal end portion of the third arm 23B. The grip portion 10B grips the first object W1 placed on the stage 37. The grip portion 10B transports the gripped first object W1 to the stage 30. The grip portion 10B transports the gripped (or arranged on the stage 37) first object W1 to the second object W2. Specifically, the first object W1 is inserted through a pin of the second object W2 by the grip portion 10B. The grip portion 10B includes a detecting device 42B which detects a force which grips the first object W1. As the detecting device 42B, for example, a pressure sensor is used, or a sensor which detects a change (a change in a current which flows through a motor) in the torque of a motor is used.

The arm 20A is obtained as the first arm 21A, the second arm 22A, and the third arm 23A are linked together in this order. The first arm 21A is connected to a base 50 via the main shaft 24 having a rotational axis in a Z-axis direction, and a base 25 having a rectangular shape in plan view. The first arm 21A is provided so as to be rotatable normally and reversely around a rotational axis L1A in a horizontal direction (a direction parallel to an XY plane) in a location where the first arm 21A is linked to the main shaft 24. The second arm 22A is provided so as to be rotatable normally and reversely around a rotational axis L2A in the horizontal direction in a location where the second arm 22A is linked to the first arm 21A. The third arm 23A is provided so as to be rotatable normally and reversely around a rotational axis L3A in the horizontal direction in a location where the third arm 23A is linked to the second arm 22A and so as to be movable in a vertical direction (Z-axis direction). In addition, the grip portion 10A is provided so as to be rotatable normally and reversely around a rotational axis L4A in the direction orthogonal to the horizontal direction in a location where the grip portion 10A is linked to the third arm 23A.

The arm 20B is obtained as the first arm 21B, the second arm 22B, and the third arm 23B are linked together in this order. The first arm 21B is connected to the base 50 via the main shaft 24 having a rotational axis in the Z-axis direction, and the base 25 having a rectangular shape in plan view. The first arm 21B is provided so as to be rotatable normally and reversely around a rotational axis L1B in the horizontal direction (the direction parallel to the XY plane) in a location where the first arm 21B is linked to the main shaft 24. The second arm 22B is provided so as to be rotatable normally and reversely around a rotational axis L2B in the horizontal direction in a location where the second arm 22B is linked to the first arm 21B. The third arm 23B is provided so as to be rotatable normally and reversely around a rotational axis L3B in the horizontal direction in a location where the third arm 23B is linked to the second arm 22B and so as to be movable in the vertical direction (Z-axis direction). In addition, the grip portion 10B is provided so as to be rotatable normally and reversely around a rotational axis L4B in the direction orthogonal to the horizontal direction in a location where the grip portion 10B is linked to the third arm 23B.

The first conveyor belt 33 and the second conveyor belt 34 are arranged so as to separate in this order from the side where the arm 20A is provided. The feeder 36 is arranged on the upstream side (+Y-direction side) of the first conveyor belt 33. The second conveyor belt 34 is larger than the first conveyor belt 33 in plan view so as to protrude to the downstream side (−Y-direction side) of the first conveyor belt 33. The first object W1 that has dropped from the first conveyor belt 33 is transported to the second conveyor belt 34 and put into an opening portion 36a of the feeder 36 on an inclined conveyor belt (not shown). In this way, the first object W1 that has not been gripped by the grip portion 10A circulates through the first conveyor belt 33, the second conveyor belt 34, and the feeder 36.

The stage 30 includes a top plate 31 on which an object is placed, and the base portion 35 which supports the top plate 31. For example, a moving mechanism which horizontally moves the top plate 31 in the X direction, and a moving mechanism which moves the top plate 31 in the Y direction are independently housed in the base portion 35, and the top plate 31 is provided in the base portion 35 so as to be movable in the horizontal direction.

The camera 40A is attached to the distal end portion of the second arm 22A that constitutes the arm 20A. As the camera 40A, for example, a CCD camera is used. The camera 40A images the first object W1 placed on the first conveyor belt 33. The captured image of the camera 40A is transmitted to the control device 60.

The camera 40B is attached to the distal end portion of the second arm 22B that constitutes the arm 20B. As the camera 40B, for example, a CCD camera is used. The camera 40B images the first object W1 and the second object W2 which are placed on the top plate 31. The captured image of the camera 40B is transmitted to the control device 60.

The control device 60 has built therein a memory, a CPU, a power circuit, and the like. The control device 60 stores operation programs which specify the operation contents of the robot 1 input from the input device 70, and starts various programs stored in the memory by the CPU to integrally control the robot 1.

Figure 2A:
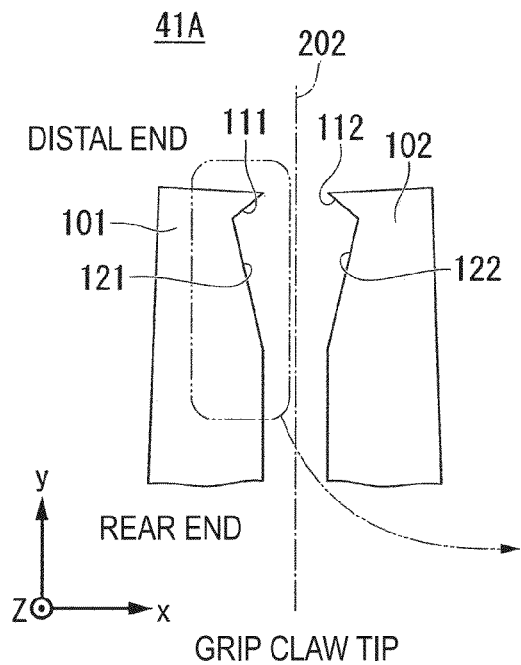
FIGS. 2A and 2B are plan views showing the configuration of a grip portion related to the present embodiment.
Figure 2B:
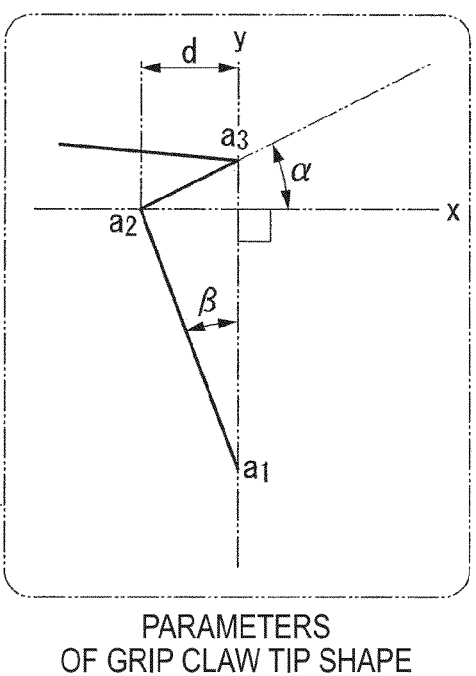

FIGS. 2A and 2B are plan views showing the configuration of the grip claw related to the present embodiment. Here, the configuration of the grip claw will be described by illustrating the grip claw 41A of the grip portion 10A of the grip portion 10A and the grip portion 10B. Since the grip claw 41B of the grip portion 10B has the same configuration as the grip claw 41A of the grip portion 10A, the detailed description thereof is omitted. FIG. 2A is a plan view showing the configuration of the grip claw, and FIG. 2B is a view illustrating parameters of the grip claw shape.

As shown in FIG. 2A, the grip claw (also referred to as a claw portion) 41A includes a grip claw 101 and a grip claw 102. The grip claws 101 and 102 have the relationship of being line-symmetrical at a datum line 202. Additionally, the grip claws 101 and 102 have first inclined surfaces (also referred to as a distal-end-side surface) 111 and 112 that inclines gradually in a direction in which the grip claws separate from each other as they go from a distal end to a rear end (also referred to as a proximal end or a base portion), and a second inclined surface (also referred to as a proximal-end-side surface or a surface on the base portion side) 121 and 122 that incline gradually in a direction in which the grip claws approach each other. Additionally, the grip claws 101 and 102 can be formed, for example, by bending a metal (plate), such as aluminum, or cutting the metal (rectangular parallelepiped).

The first object W1 is gripped near the distal ends of the grip claw 101 and the grip claw 102 through such configuration. For this reason, the grip claws 101 and 102 can realize three functions of caging, self-alignment, and frictional grip in order to grip and transport the first object W1. The control device 60 controls to make the grip claws 101 and 102 grip the first object W1 at four or more contact points.

In addition, the "caging" means that the first object W1 is in a space closed by the pair of the grip claws 101 and 102 at a position or in a posture with an object (the first object W1). In the caging, the position or posture of the first object W1 is free without being constrained by the grip claws 101 and 102.

The "self-alignment" means moving the first object W1 to a predetermined position in the closed space depending on the shape of the grip claws 101 and 102 and the frictional force between the grip claws 101 and 102 and the first object W1, when the grip claws 101 and 102 pinche the first object W1.

The "frictional grip" means that the grip claws 101 and 102 come into contact with the first object W1 at four or more contact points to constrain the first object W1, and constrain and grip the first object W1 in a direction vertical to a surface 33a where the first object W1 is arranged by a frictional force.

As shown in FIG. 2B, the distal end of the grip claw 101 has a triangular (also referred to as a recess) shape (hereinafter referred to as a grip claw shape) surrounded by apexes $a_1$, $a_2$, and $a_3$. This grip claw shape is expressed by three parameters $\alpha$, $\beta$, and d. The symbol $\beta$ represents an angle made between a line segment $a_1a_2$ and a line segment $a_1a_3$, and the symbol $\alpha$ represents an angle made between a line segment $a_2a_3$ and a perpendicular line (also referred to as a base line) in a case where the perpendicular line is drawn from the apex $a_2$ to the line segment $a_1a_3$. Additionally, the symbol d represents the height (=$a_2a_3 \cos \alpha$) from the base of a triangle $a_1a_2a_3$ to $a_2$. Additionally, a point $a_2$ which is an intersection between the first inclined surface 111 and the second inclined surface 121 is also referred to as a base point.

In the grip claw 101, a range where the parameters $\alpha$, $\beta$, and d of the grip claw shape are acquired becomes like the following Formula (1).

$$\begin{cases} 0 < d \\ 0 < \alpha < \dfrac{\pi}{2} \\ 0 < \beta < \dfrac{\pi}{2} \end{cases} \quad (1)$$

A technique of calculating the parameters α, β, and d of this grip claw shape will now be described below.

Figure 3A:
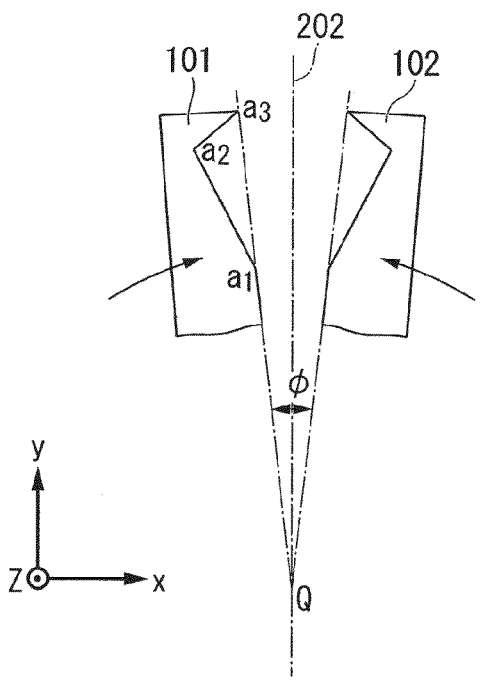
FIGS. 3A and 3B are views illustrating an opening and closing mechanism of the grip claws related to the present embodiment.
Figure 3B:
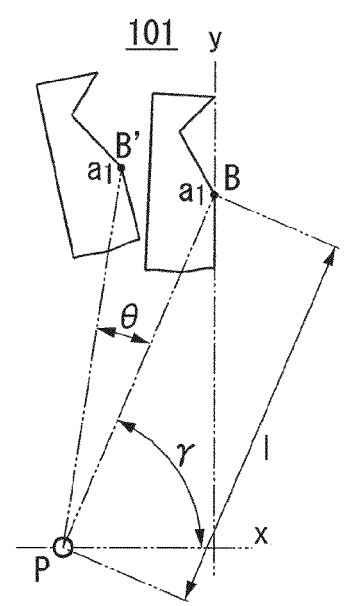

FIGS. 3A and 3B are views illustrating an opening and closing mechanism of the grip claws related to the present embodiment. As shown in FIG. 3A, the control device 60 controls an angle φ made between the lines obtained by extending mutual sides $a_1a_3$ with a point Q intersected by extending sides that connect respective apexes $a_1$ and $a_3$ being as a center, thereby opening and closing the grip claws 101 and 102. Additionally, the grip claws 101 and 102 are expressed by three parameters (hereinafter referred to as opening and closing parameters) θ, γ, and l in the opening and closing of the grip claw 101. The point P represents a center of rotation, and the symbol l represents the distance from the point P to a lower end $a_1$ (point B; also referred to as the end of a proximal-end-side surface) of the triangle $a_1a_2a_3$ of the grip claw 101. The symbol γ represents an angle formed by BP and the x-axis when the grip portion 101 is closed, and the symbol θ represents an angle made between BP when the grip portion 101 is closed and B'P when the grip claw 101 is opened.

Figure 4:
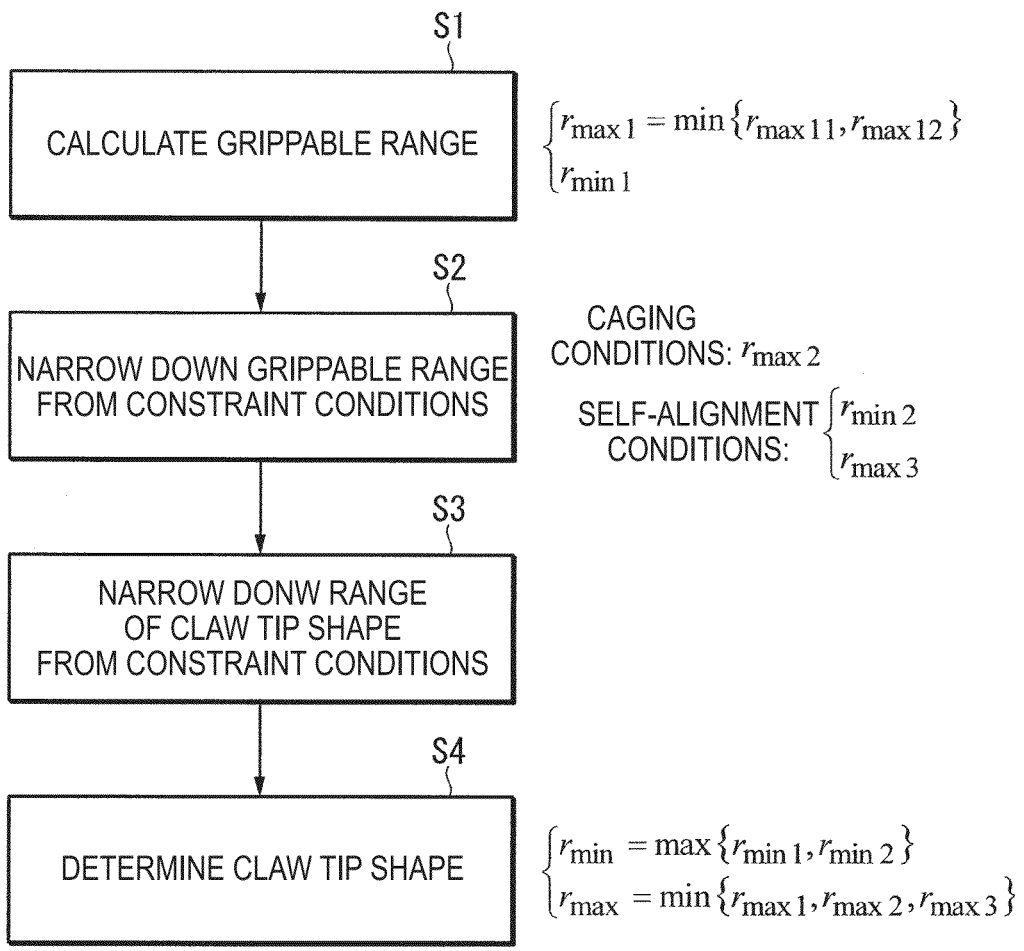
FIG. 4 is a view illustrating a procedure for calculating parameters $\alpha$, $\beta$, and d of the grip claw shape related to the present embodiment.

Next, a procedure for calculating the parameters α, β, and d of the grip claw shape will be described with reference to a drawing. FIG. 4 is a view illustrating the procedure for calculating the parameters α, β, and d of the grip claw shape related to the present embodiment.

First, the outline of the procedure for calculating the parameters α, β, and d of the grip claw shape will be described with reference to FIG. 4.

A grip claw design device (not shown) calculates a range capable of being gripped by the grip claws 101 and 102 (Step S1). In addition, although an example in which the parameters α, β and d of the grip claw shape of the grip claws 101 and 102 are calculated by the grip claw design device will be described in the present embodiment, for example, an arithmetic device which performs calculation according to this calculation procedure or a designer of the grip claw may perform this calculation.

Next, the grip claw design device performs narrowing-down of the range capable of being gripped by the grip claws 101 and 102, using constraint conditions including caging conditions and self-alignment conditions to be described below (Step S2).

Next, the grip claw design device performs narrowing-down of the range of the claw tip shape of the grip claws 101 and 102 from the constraint conditions (Step S3).

Next, the grip claw design device calculates the claw tip shape of the grip claws 101 and 102, that is, calculates the parameters α, β, and d of the grip claw shape (Step S4).

Conditions of Frictional Grip

Next, the technique of calculating a range capable of being gripped by the grip claws 101 and 102, which is performed in Step S1, will be described in detail. The conditions on the object W1 gripped by the grip claws 101 and 102 are that the grip claws 101 and 102 contact and constrain the object W1 at least at three contact points (conditions of frictional grip).

Here, first, the grip claw design device obtains the maximum size of the object W1 (part) capable of being gripped by the grip claws 101 and 102.

Figure 5:
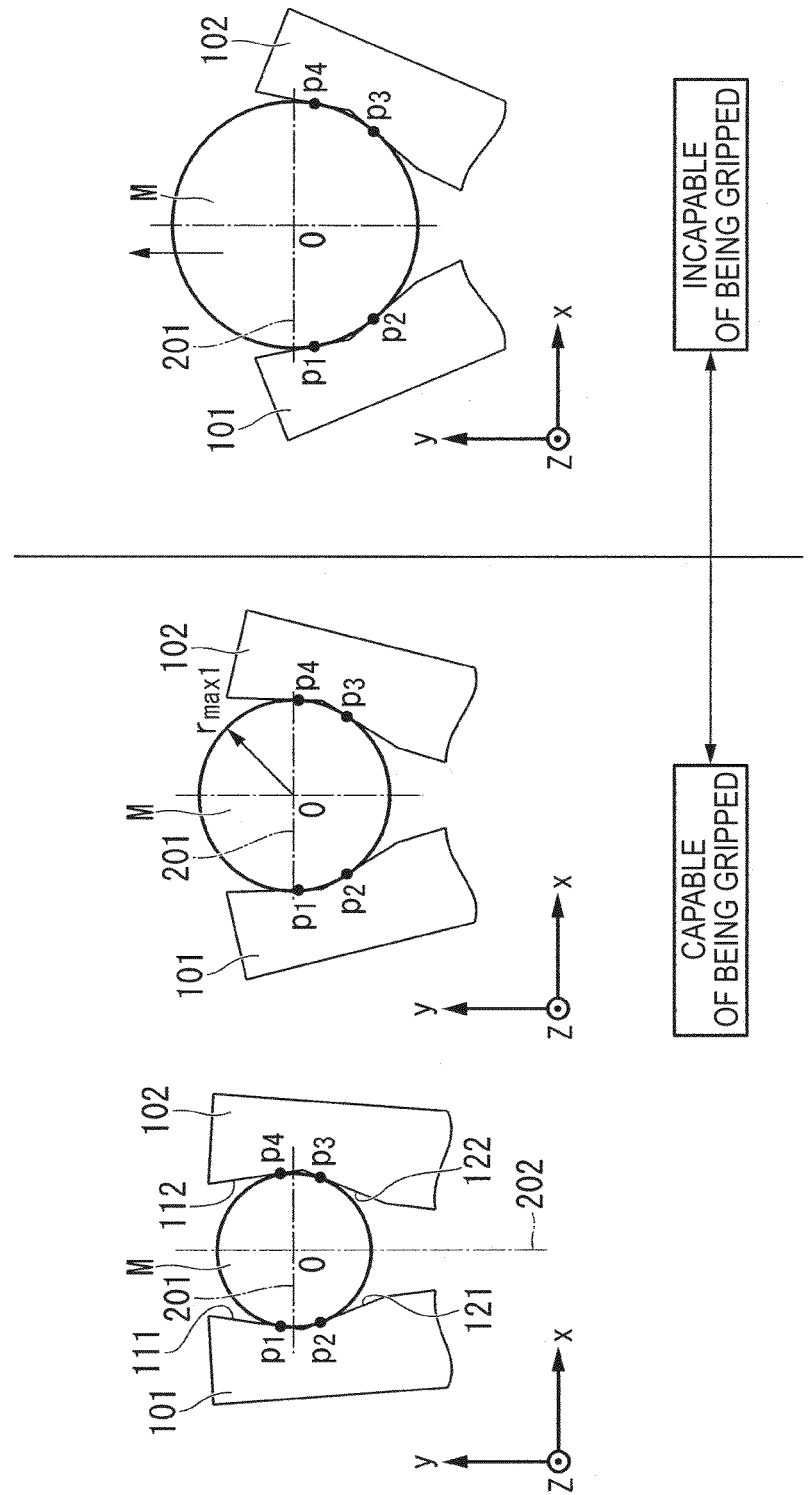
FIGS. 5A to 5C are views illustrating a part capable of being gripped by the grip claws related to the present embodiment.

FIGS. 5A to 5C are views illustrating a part capable of being gripped by the grip claws related to the present embodiment. In this drawing, the shape of the object M gripped by the grip claws 101 and 102 is circular (for example, columnar) as seen from the xy plane. Additionally, in the following description, in order to calculate the parameters α, β, and d of the grip claw shape, the shape of the triangles of the distal ends of the aforementioned grip claws 101 and 102 will be described. In addition, in the following description, even grip portions in which the parameters α, β, and d of the grip claw shape are different are referred to as grip portions 101 and 102 by using the common reference numerals 101 and 102. Additionally, the object W1 gripped by the grip claws 101 and 102 is referred to as a part M, using a common symbol M, even if the size of the object is different. Additionally, as shown in FIGS. 5A to 5C, a contact point between the first inclined surface 111 of the grip claw 101 and the part M is referred to as a point $p_1$, a contact point between the second inclined surface 121 of the grip claw 101 and the part M is referred to as a point $p_2$, a contact point between the first inclined surface 112 of the grip claw 102 and the part M is referred to as a point $p_4$, and a contact point between the second inclined surface 122 of the grip claw 102 and the part M is referred to as a point $p_3$. Additionally, the central point o of the part M is on the datum line 202, and a line segment passing through the central point o and is perpendicular to this datum line 202 is referred to a centerline 201.

FIG. 5A is a view illustrating a part capable of being gripped by the grip claws 101 and 102, FIG. 5B is a view illustrating a maximum size of a part capable of being gripped by the grip claws 101 and 102, and FIG. 5C is a view illustrating a part incapable of being gripped by the grip claws 101 and 102.

As shown in FIG. 5A, the centerline 201 is located between a line segment which connects the contact points $p_1$ and $p_4$ and a line segment which connects the contact points $p_2$ and $p_3$. In the case of such a state, since the grip claws 101 and 102 can grip the part M so as to surround the part by the four contact points, the part M is stably gripped by frictional grip.

As shown in FIG. 5C, the centerline 201 is located in a positive direction in a y direction from the line segment which connects contact points $p_1$ and $p_4$. In the case of such a state, since the grip claws 101 and 102 cannot grip the part M so as to surround the part by the four contact points, there is a case where the part M cannot be stably gripped by frictional grip. For example, in a case where the frictional coefficient between the part M and the grip claws 101 and 102 is smaller than a predetermined value, the part M may fall out and jump out in the positive direction in the y direction from the frictionally-gripped state.

For this reason, as shown in FIG. 5B, the maximum size of a part M gripped by the grip claws 101 and 102 is a case where the centerline 201 coincides with the line segment which connects the contact points $p_1$ and $p_4$. The maximum radius of a part M which can be gripped by the surfaces (the first inclined surfaces 111 and 112 and the second inclined surfaces 121 and 122) of the grip claws 101 and 102 is represented by $r_{max1}$ (hereinafter referred to as a grippable maximum size).

Figure 6:
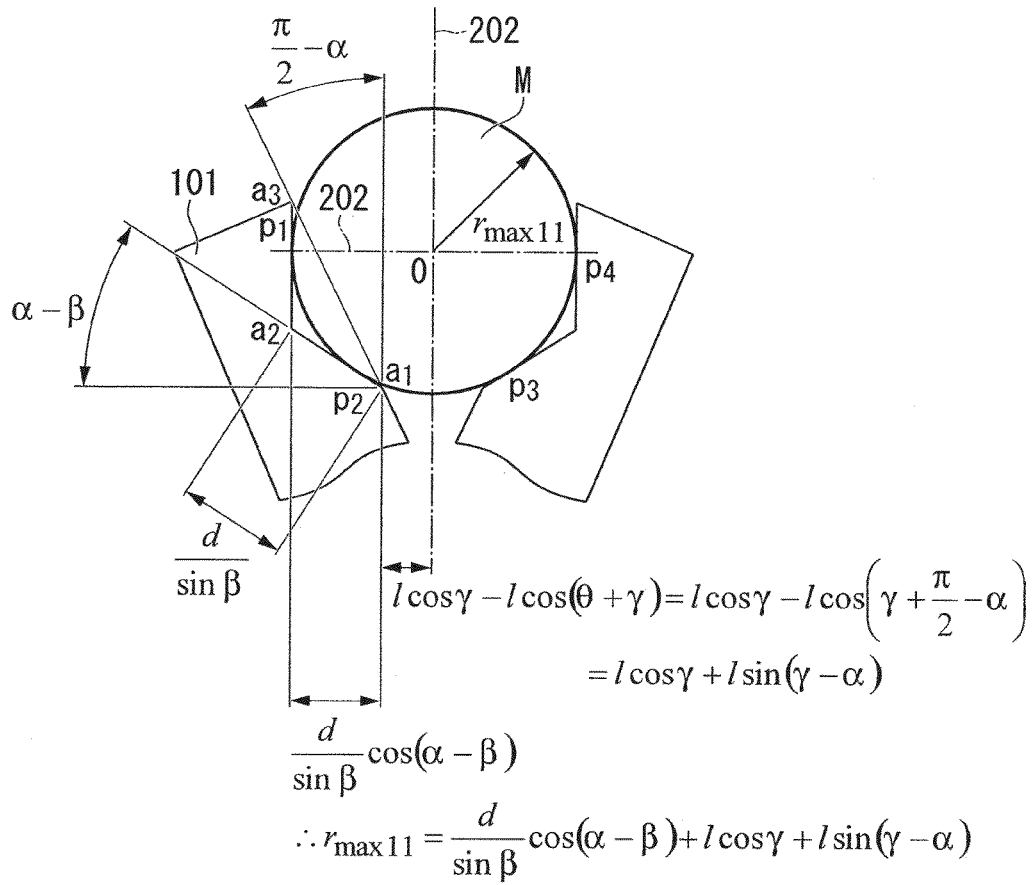
FIG. 6 is a view illustrating the relationship between a grippable maximum size and the parameters $\alpha$, $\beta$, and d of the grip claw shape, related to the present embodiment.

FIG. 6 is a view illustrating the relationship between the grippable maximum size and the parameters α, β, and d of the grip claw shape, related to the present embodiment. As shown in FIG. 6, the grip claws 101 and 102 surrounds the part M at four contact points $p_1$ to $p_4$. That is, all the contact points $p_1$ to $p_4$ are on the surfaces (the first inclined surfaces 111 and 112 and the second inclined surfaces 121 and 122) of the grip claws 101 and 102. The grippable maximum size capable of surrounding the part M at the four contact points is represented by $r_{max11}$.

Figure 7A:
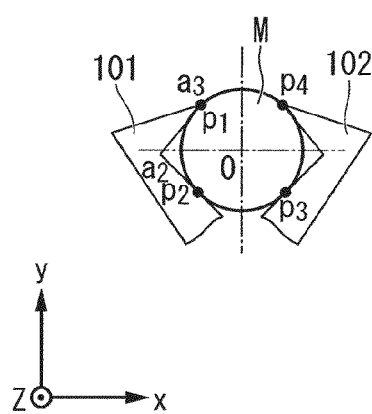
FIGS. 7A and 7B are views illustrating the size of a part capable of being gripped depending on the relationship between the apexes of the grip claws and a part, related to the present embodiment.
Figure 7B:
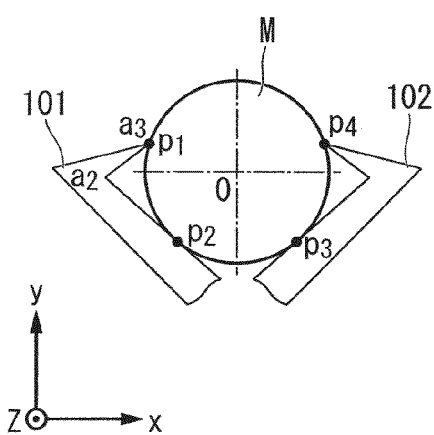

FIGS. 7A and 7B are views illustrating the size of a part capable of being gripped depending on the relationship between the apexes of the grip claws and a part, related to the present embodiment. FIGS. 8A and 8B are views illustrating the relationship between the apexes of the grip claws and a part, related to the present embodiment.

FIG. 7A is a view illustrating a case capable of being gripped, and FIG. 7B is a view illustrating a case incapable of being gripped. In addition, in the following description, a case where the part M is resin or the like softer than the material of the grip claws 101 and 102 will be described.

As shown in FIG. 7A, the part M comes into contact with the second inclined surface 121 of the grip claw 101 at the contact point $p_2$, and comes into contact with the second inclined surface 122 of the grip claw 102 at the contact point $p_3$. The part M does not come into contact with the first inclined surface 111 of the grip claw 101, and comes into contact with the apex $a_3$ (contact point $p_3$) of the triangle $a_1a_2a_3$ of the distal end of the grip claw 101. In the contact point $p_1$, a side $a_2a_3$ of the triangle $a_1a_2a_3$ of the grip claw 101 is a tangential line of the part M. For this reason, the apex $a_3$ of the grip claw 101 is not pierced into the part M.

On the other hand, as shown in FIG. 7B, similarly to FIG. 7A, the part M comes into contact with the second inclined surface 121 of the grip claw 101 at the contact point $p_2$, and comes into contact with the second inclined surface 122 of the grip claw 102 at the contact point $p_3$. However, the apex $a_3$ and the part M of the grip claw 101 come into contact with each other at the contact point $p_1$. In this case, in the contact point $p_1$, the side $a_2a_3$ of the triangle $a_1a_2a_3$ of the grip claw 101 is not a tangential line of the part M. For this reason, the apex $a_3$ of the grip claw 101 is pierced into the part M. That is, as the condition of the grippable maximum size, the apex $a_3$ or the apex $a_1$ of the grip claw 101 does not need to be pierced into the part M.

Hereinafter, the apexes $a_3$ of the grip claws 101 and 102 and the apexes $a_1$ of the grip claws 101 and 102 are referred to as claw tips.

FIG. 8A is a view illustrating the conditions that the apexes $a_3$ of the grip claws 101 and 102 are not pierced into the part M. FIG. 8B is a view illustrating the conditions that the apexes $a_1$ of the grip claws 101 and 102 are not pierced into the part M. In the case classification of FIG. 8A and FIG. 8B, the parameter $\alpha$ of the grip claw shape is less than $\pi/2-\beta$ or equal to or more than $\pi/2-\beta$. As such, the grippable maximum size to which the conditions that apart is not pierced by the claw tips gripped are added is represented by $r_{max12}$.

As a result, as shown in FIGS. 6 and 8, the grippable maximum size $r_{max1}$ becomes like the following Formulas (2) to (4) by the parameters $\alpha$, $\beta$, and d of the grip claw shape, and the opening and closing parameters $\theta$, $\gamma$, and l from geometric relationship.

$$r_{max1} = \min\{r_{max11}, r_{max12}\} \quad (2)$$

$$r_{max11} = \frac{d}{\sin\beta}\cos(\alpha - \beta) + l\cos\gamma + l\sin(\gamma - \alpha) \quad (3)$$

$$r_{max12} = \begin{cases} \dfrac{d}{\cos\alpha}\tan\left(\dfrac{\frac{\pi}{2} - \beta + \alpha}{2}\right), & \text{if } \alpha < \dfrac{\pi}{2} - \beta \\ \dfrac{d}{\sin\beta}\tan\left(\dfrac{\frac{\pi}{2} - \beta + \alpha}{2}\right), & \text{if } \alpha \geq \dfrac{\pi}{2} - \beta \end{cases} \quad (4)$$

In addition, in Formula (2), as for $r_{max1}$, whether $r_{max11}$ or $r_{max12}$ is selected differs depending on the shape of the claw tips. Additionally, in Formula (4), "if" represents a case classification. If $\alpha$ is less than $\pi/2-\beta$, $r_{max12}=d/\cos(\alpha)\times\tan((\pi/2-\beta+\alpha)/2)$, and if $\alpha$ is equal to or more than $\pi/2-\beta$, $r_{max12}=d/\sin(\beta)\times\tan((\pi/2-\beta+\alpha)/2)$.

Next, a state where the grip claws 101 and 102 are closed will be described. FIGS. 9A to 9C are views illustrating the size of a part capable of being gripped when the grip claws related to the present embodiment are closed.

As shown in FIG. 9B, in a case where the grip claws 101 and 102 are closed, the respective surfaces of the first inclined surfaces 111 and 112 and the second inclined surfaces 121 and 122 of the grip claws 101 and 102 come in contact with the part M at the contact points $p_1$ to $p_4$, respectively. The part M in this state has a minimum size $r_{min1}$ capable of being gripped by the grip claws 101 and 102.

On the other hand, as shown in FIG. 9A, in a case where the part M is small, when the grip claws 101 and 102 are closed, the part M cannot come in contact with all the four contact points $p_1$ to $p_4$. Such a state is a state where the grip claws 101 and 102 cannot grip the part M (incapable of being gripped). Additionally, as shown in FIG. 9C, the rear end of the part M comes in contact with the contact points $p_2$ and $p_3$ in the second inclined surfaces 121 and 122 of the grip claws 101 and 102. The contact points $p_1$ and $p_4$ between the distal end of the part M and the grip claws 101 and 102 are the tips $a_3$ of the grip claws 101 and 102. Additionally, the line segment $a_2a_3$ is a tangential line of the part M. Since such a state is a state where the grip claws 101 and 102 are not pierced into the part M as described in FIGS. 8A and 8B, a state capable of being gripped is brought about.

Figure 10:
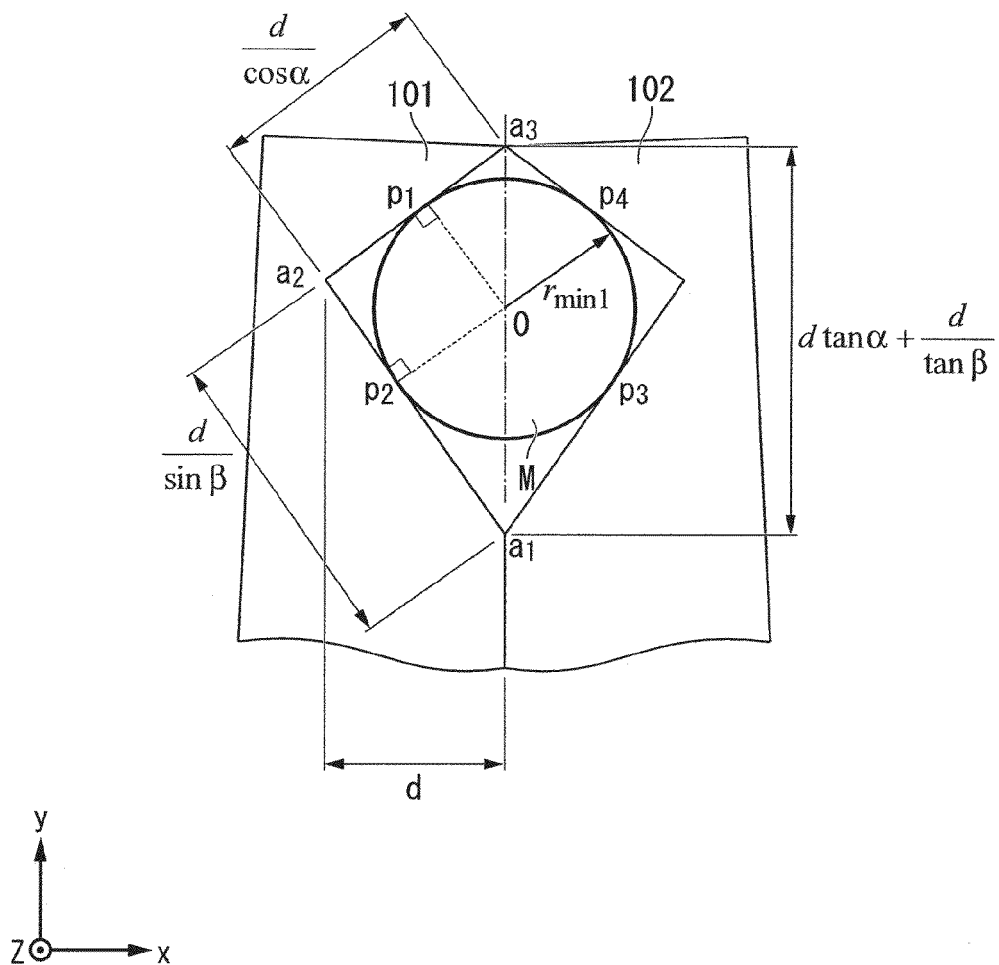
FIG. 10 is a view illustrating the calculation of the minimum size of a part capable of being gripped by the grip claws related to the present embodiment.

FIG. 10 is a view illustrating calculation of the minimum size of a part capable of being gripped by the grip claws related to the present embodiment. This state, similarly to the FIG. 9B, is a state where, when the grip claws 101 and 102 are closed, the part M comes in contact with the surfaces (the first inclined surfaces 111 and 112 and the second inclined surfaces 121 and 122) of the grip claws 101 and 102 at the four contact points $p_1$ to $p_4$. Since the part M is circular, the minimum size $r_{min1}$ of a part M capable of being gripped by the grip claws 101 and 102 is the radius of an inscribed circle when closing the claws. Accordingly, the minimum size of a part capable of being gripped is obtained like the following Formula (5) from the geometric relationship shown in FIG. 10.

$$r_{min1} = \frac{d\cos(\alpha - \beta)}{\cos\alpha + \sin\beta} \quad (5)$$

The description of the operation performed in Step S1 is ended above.

Next, the processing performed in Step S2 will be described in detail. In Step S2, narrowing-down of the range capable of being gripped by the grip claws 101 and 102 is performed, using caging conditions and self-alignment conditions as constraint conditions.

Figures 11A, 11B:
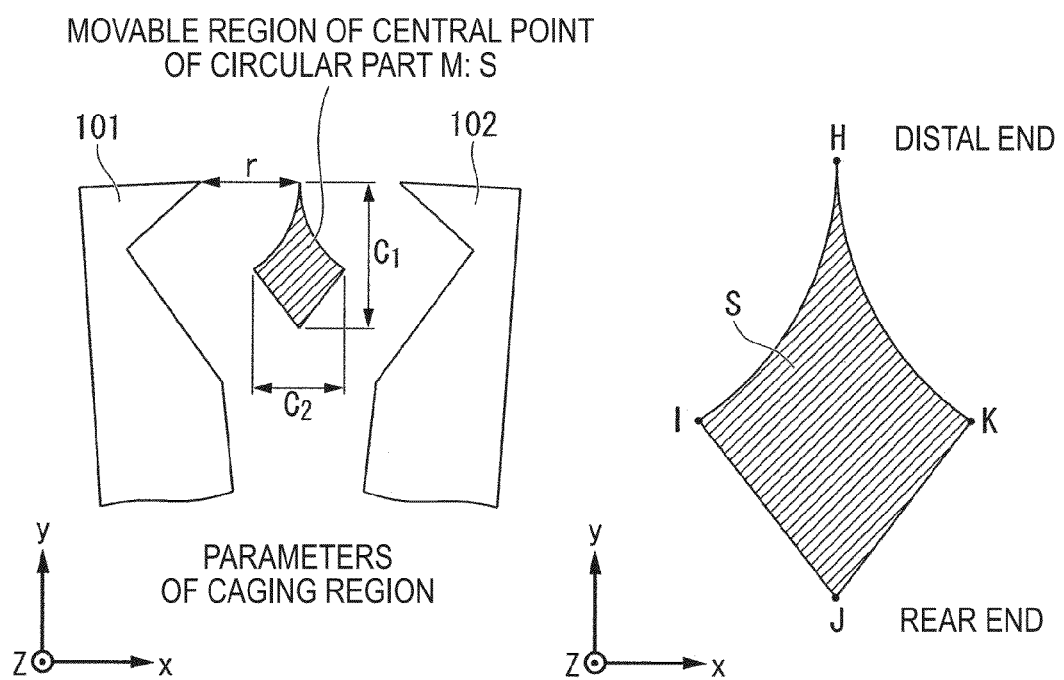
FIGS. 11A and 11B are views illustrating the parameters of a caging region related to the present embodiment.

FIGS. 11A and 11B are views illustrating parameters of a caging region related to the present embodiment. As shown in FIG. 11A, a symbol r represents the radius of the part M. In a space S where the central point o of the part M can move freely, the length of the space in the x direction is represented by $c_2$, and the length of the space in the y direction is represented by $c_1$. Additionally, as shown in FIG. 11B, a symbol H represents an apex of the caging region S on the side of the positive direction in the y direction, and a symbol J represents an apex of the caging region on the side of the negative direction in the y direction. Additionally, a symbol I represents an apex of the caging region S in the x direction on the side of the negative direction with respect to a line segment HJ, and a symbol K represents an apex of the caging region in the x direction on the side of the positive direction with respect to the line segment HJ. That is, the length $c_1$ in the y direction is the distance between the apexes H and J, and the length $c_2$ in the x direction is the distance between the apexes I and K.

Figure 12A:
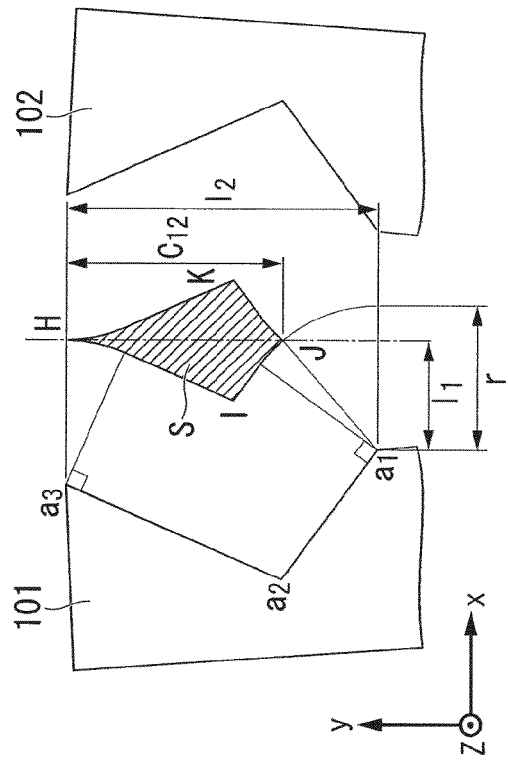
FIGS. 12A and 12B are views illustrating the shape and respective parameters of the caging region related to the present embodiment.
Figure 12B:
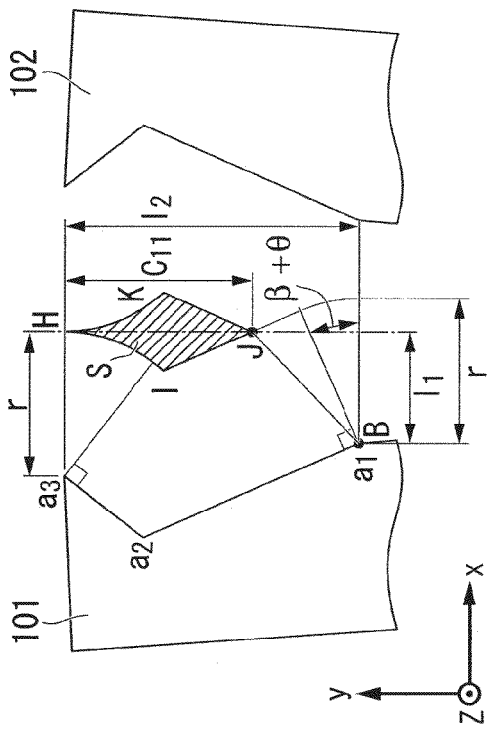

FIGS. 12A and 12B are views illustrating the shape and respective parameters of a caging region related to the present embodiment.

First, symbols will be defined. As shown in FIGS. 12A and 12B, in the triangle $a_1 a_2 a_3$ of the grip claws 101 and 102, a symbol $l_2$ represents the distance in the y direction between the apexes $a_3$ and $a_1$. Additionally, the length $c_1$ in the y direction described in FIGS. 11A and 11B is represented by symbols $c_{11}$ and $c_{12}$ according to the shape of a caging region. Additionally, the length $c_2$ in the x direction described in FIGS. 11A and 12B is represented by symbols $c_{21}$, $c_{22}$, and $c_{23}$, and $c_{24}$ according to the shape of a caging region. Additionally, a symbol $l_1$ represents the apex $a_1$ of the triangle $a_1 a_2 a_3$ with a symbol B, and represents the distance in the x direction between the point B and the apex J.

First, as shown in FIGS. 12A and 12B, case classification is made into the lengths $c_{11}$ and $c_{12}$ in the y direction depending on the shape of a region surrounded by apexes IJK of the caging region S. The distance between the tip positions of the claw tips of the right and left grip claws 101 and 102 becomes equal to or less than the diameter of the part M. That is, the upper end of the distance $c_{11}$ becomes a middle point of the tip positions of the claw tips of the right and left grip claws 101 and 102.

As shown in FIG. 12A, as the line segments of the caging region S, a line segment between the apexes I and J is a straight line, and a line segment between the apexes J and K is a straight line. As the line segments of the caging region S, a line segment between the apexes H and I is not a straight line, and a line segment between the apexes H and K is not a straight line. Additionally, as shown in FIG. 12A, the distance between the point B and the apex J is not r. The length in the y direction of the caging region S in such a state is defined as $c_{11}$.

As shown in FIG. 12B, as the line segments of the caging region S, not only a line segment between the apexes I and J is not a straight line, but also a line segment between the apexes J and K is not a straight line. That is, as shown in FIG. 12B, the line segment between the apexes I and J has a straight line and a curved line. As for the line segments of the caging region S, a line segment between the apexes H and I and a line segment between the apexes H and K have a straight line and a curved line, respectively. Additionally, as shown in FIG. 12B, the distance between the point B and the apex J is r. The length in the y direction of the caging region S in such a state is defined as $c_{12}$.

As shown in FIGS. 12A and 12B, the distance $c_1$ of the caging region S in the y direction is case-classified like the following Formula (6).

The lengths $c_{11}$ and $c_{12}$ of the caging region S in the y direction become like the following Formulas (7) and (8) from the geometric relationship shown in FIGS. 12A and 12B.

$$c_1 = \begin{cases} c_{11}, & \text{if } l_1 < r\cos(\beta + \theta) \\ c_{12}, & \text{if } l_1 \geq r\cos(\beta + \theta) \end{cases} \quad (6)$$

$$c_{11} = l_2 - \left( \frac{r}{\sin(\beta + \theta)} - \frac{l_1}{\tan(\beta + \theta)} \right) \quad (7)$$

$$c_{12} = l_2 - \sqrt{r^2 - l_1^2} \quad (8)$$

In Formulas (7) and (8), the distance $l_1$ and the distance $l_2$ satisfy the following Formulas (9) and (10).

$$l_1 = l\cos\gamma - l\cos(\gamma + \theta) \quad (9)$$

$$l_2 = \left( d\tan\alpha + \frac{d}{\tan\beta} \right) \cos\theta \quad (10)$$

Additionally in Formulas (7) and (8), the angle $\theta$ satisfies the following Formula (11).

$$\theta = 2\tan^{-1}\left( \frac{-a + \sqrt{a^2 + b^2 + c^2}}{c - b} \right) \quad (11)$$

In addition, in Formula (11), a, b, and c satisfy the following Formulas (12) to (14).

$$a = d\tan\alpha + \frac{d}{\tan\beta} + l\sin\gamma \quad (12)$$

$$b = -l\cos\gamma \quad (13)$$

$$c = l\cos\gamma - r \quad (14)$$

Caging Conditions

Next, as shown in FIGS. 13 to 16, the distance $c_2$ of the caging region S in the x direction is case-classified into $c_{21}$ to $c_{24}$ depending on the shape of the caging region S.

Figure 13:
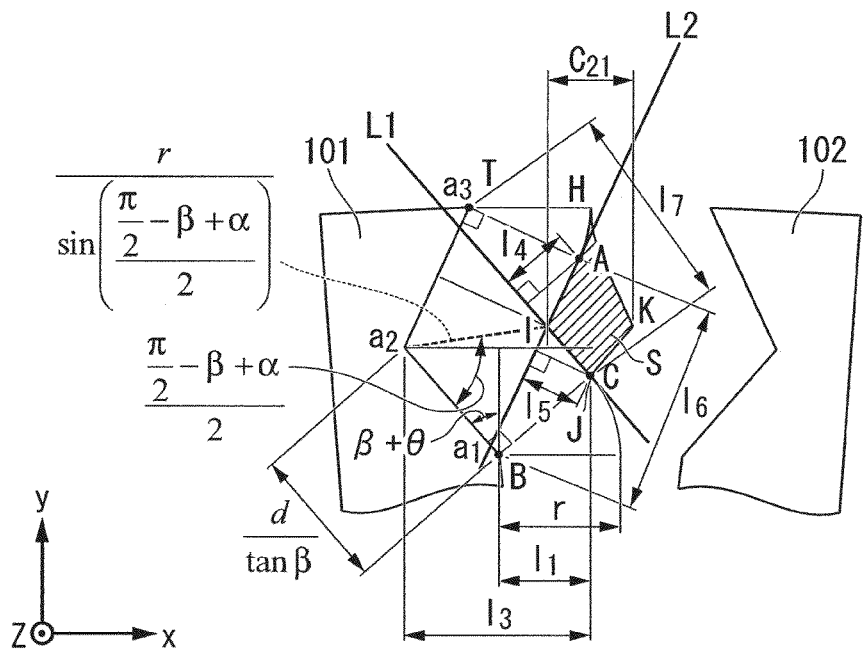
FIG. 13 is a view illustrating a case where the distance of the caging region related to the present embodiment in an x direction is $c_{21}$.
Figure 14:
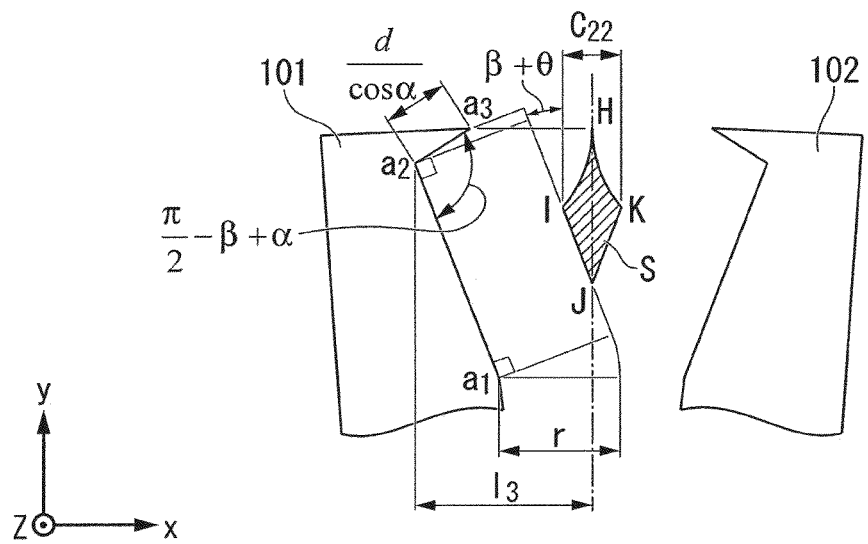
FIG. 14 is a view illustrating a case where the distance of the caging region related to the present embodiment in the x direction is $c_{22}$.
Figure 15:
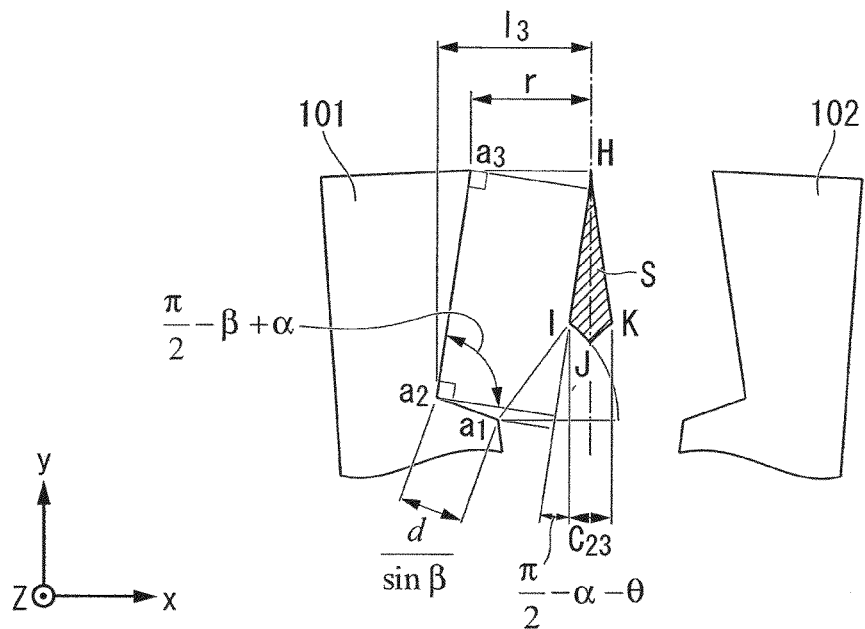
FIG. 15 is a view illustrating a case where the distance of the caging region related to the present embodiment in the x direction is $c_{23}$.
Figure 16:
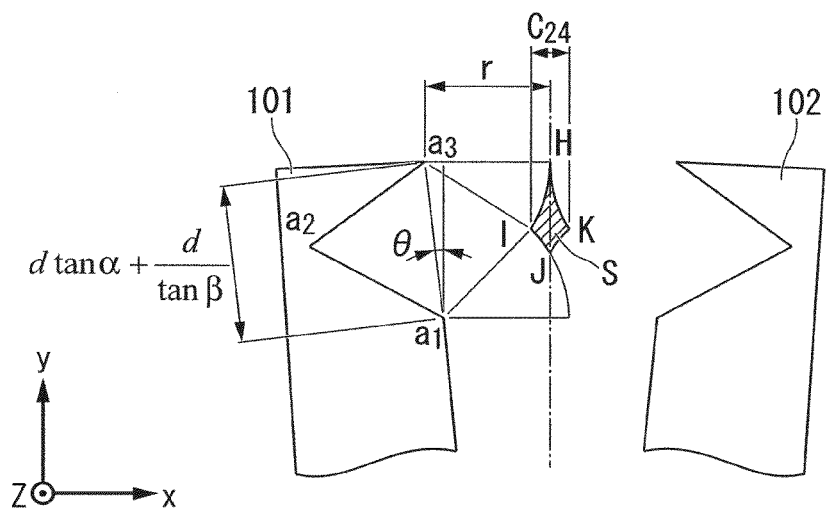
FIG. 16 is a view illustrating a case where the distance of the caging region related to the present embodiment in the x direction is $c_{24}$.

FIG. 13 is a view illustrating a case where the distance of the caging region related to the present embodiment in the x direction is $c_{21}$. FIG. 14 is a view illustrating a case where the distance of the caging region related to the present embodiment in the x direction is $c_{22}$. FIG. 15 is a view illustrating a case where the distance of the caging region related to the present embodiment in the x direction is $c_{23}$. FIG. 16 is a view illustrating a case where the distance of the caging region related to the present embodiment in the x direction is $c_{24}$.

First, symbols used in FIGS. 13 to 16 will be defined. A symbol T represents the apex $a_3$ of the triangle $a_1 a_2 a_3$ of the grip claw 101 and a symbol B represents the apex $a_1$. Additionally, a symbol C represents the apex J of the caging region S. A symbol L1 represents a straight line passing through a line segment which connects the apex J and an apex I of the caging region S. A symbol A represents an end point of a linear region between the apex I and an apex H. That is, in FIG. 13, a line segment IA is a straight line and a line segment AH is a curved line. The straight line L2 is a straight line passing through the linear region IA between the apex I and the apex H of the caging region S. A symbol $l_3$ represents the distance in the x direction between the apex J of the caging region S and the apex $a_2$ of the triangle $a_1 a_2 a_3$ of the grip claw 101. Additionally, a symbol $l_4$ represents the distance between a point A (a boundary (upper side) between an arc and a straight line) and the straight line L1, and a symbol $l_5$ represents the distance between a point C (a boundary (lower side) between an arc and a straight line) and the straight line L2. A symbol $l_6$ represents the distance between the point A and the point B (the tip of the claw tip), and $l_7$ represents the distance between the point C and a point T (the tip of the claw tip).

As shown in FIGS. 13 to 16, the distance $c_2$ of the apex IK of the caging region S is case-classified like the following Formula (15).

$$c_2 = \begin{cases} c_{21}, & \text{if } (l_4 \geq 0 \wedge l_5 \geq 0) \\ c_{22}, & \text{if } (l_4 < 0 \wedge l_5 \geq 0) \vee ((l_4 < 0 \wedge l_5 < 0) \wedge (l_6 < r \wedge l_7 \geq r)) \\ c_{23}, & \text{if } (l_4 \geq 0 \wedge l_5 < 0) \vee ((l_4 < 0 \wedge l_5 < 0) \wedge (l_6 \geq r \wedge l_7 < r)) \\ c_{24}, & \text{if } (l_4 < 0 \wedge l_5 < 0) \wedge ((l_6 \geq r \wedge l_7 \geq r) \vee (l_6 < r \wedge l_7 < r)) \end{cases} \quad (15)$$

In Formula (15), for example, "$l_4$ is greater than 0 (zero)" means that there is a linear region between the apex I and the apex H of the caging region S. Additionally, "$l_4$ is less than 0 (zero)" means that there is not a linear region between the apex I and the apex H of the caging region S, that is, there is a curved region. Additionally, "$l_4$ is equal to or more than 0 (zero)" means that there is a linear region between the apex I and the apex H of the caging region S, and a curved region is included.

As shown in FIG. 13, in the caging region S having a distance $c_{21}$, a section between the apex H and the apex I is formed by a straight line and a curved line, and, a section between the apex I and the apex J is formed only by a straight line. As shown in FIG. 14, in the caging region S having a distance $c_{22}$, a section between the apex H and the apex I is formed only by a curved line, and, a section between the apex I and the apex J is formed only by a straight line. As shown in FIG. 15, in the caging region S having a distance $c_{23}$, a section between the apex H and the apex I is formed by a straight line and a curved line, and, a section between the apex I and the apex J is formed only by a curved line. As shown in FIG. 16, in the caging region S having a distance $c_{24}$, a section between the apex H and the apex I is formed only by a curved line, and, a section between the apex I and the apex J is formed only by a curved line.

The lengths $c_{21}$ to $c_{24}$ of the caging region S in the x direction become like the following Formulas (16) to (19) from the geometric relationship shown in FIGS. 13 to 16.

$$c_{21} = 2l_3 - \frac{2r\cos\left(\frac{\frac{\pi}{2} - \beta - \alpha}{2} - \theta\right)}{\sin\left(\frac{\frac{\pi}{2} - \beta + \alpha}{2}\right)} \quad (16)$$

$$c_{22} = 2l_3 - 2r\cos(\beta + \theta) - \frac{2\sin(\beta + \theta)}{\cos\alpha}\left(d\sin(\beta - \alpha) + \sqrt{2dr\cos\alpha\cos(\beta - \alpha) - d^2\cos^2(\beta - \alpha)}\right) \quad (17)$$

$$c_{23} = 2l_3 - 2r\sin(\alpha + \theta) - \frac{2\cos(\alpha + \theta)}{\sin\beta}\left(d\sin(\beta - \alpha) + \sqrt{2dr\sin\beta\cos(\beta - \alpha) - d^2\cos^2(\beta - \alpha)}\right) \quad (18)$$

$$c_{24} = 2r - \left(d\tan\alpha + \frac{d}{\tan\beta}\right)\sin\theta - \cos\theta\sqrt{4r^2 - \left(d\tan\alpha + \frac{d}{\tan\beta}\right)^2} \quad (19)$$

In addition, in Formulas (16) to Formula (19), $l_3$ to $l_7$ and the angle $\theta$ satisfy the following Formulas (20) to (25).

$$l_3 = l\cos\gamma - l\cos(\gamma + \theta) + \frac{d\sin(\beta + \theta)}{\sin\beta} \quad (20)$$

$$l_4 = \frac{d\cos(\alpha - \beta)}{\cos\alpha} + r\sin(\alpha - \beta) - r \quad (21)$$

$$l_5 = \frac{d\cos(\alpha - \beta)}{\sin\beta} + r\sin(\alpha - \beta) - r \quad (22)$$

$$l_6 = \sqrt{r^2 + \left(d\tan\alpha + \frac{d}{\tan\beta}\right)^2 - 2r\left(d\tan\alpha + \frac{d}{\tan\beta}\right)\cos\alpha} \quad (23)$$

$$l_7 = \sqrt{r^2 + \left(d\tan\alpha + \frac{d}{\tan\beta}\right)^2 - 2r\left(d\tan\alpha + \frac{d}{\tan\beta}\right)\sin\beta} \quad (24)$$

$$\theta = 2\tan^{-1}\left(\frac{-a + \sqrt{a^2 + b^2 - c^2}}{c - b}\right) \quad (25)$$

In addition, in Formula (25), a, b, and c satisfy the following Formulas (26) to (28).

$$a = d\tan\alpha + \frac{d}{\tan\beta} + l\sin\gamma \quad (26)$$

$$b = -l\cos\gamma \quad (27)$$

$$c = l\cos\gamma - r \quad (28)$$

As the caging region S is larger, a more robust grip becomes possible with respect to the positional error of the part M. Additionally, as the part M is larger, the values of the distances $c_1$ and $c_2$ of the caging region S become smaller. Thus, the size of a part M when the minimum value $c_{lim}$ of an allowable positional error is determined, and the distance $c_1$ or $c_2$ falls below the minimum value $c_{lim}$ is defined as a maximum size $r_{max2}$ capable of being caged. The grip claw design device obtains $r_{max2}$ through numerical calculation from Formulas (6) and (15).

Figure 17:
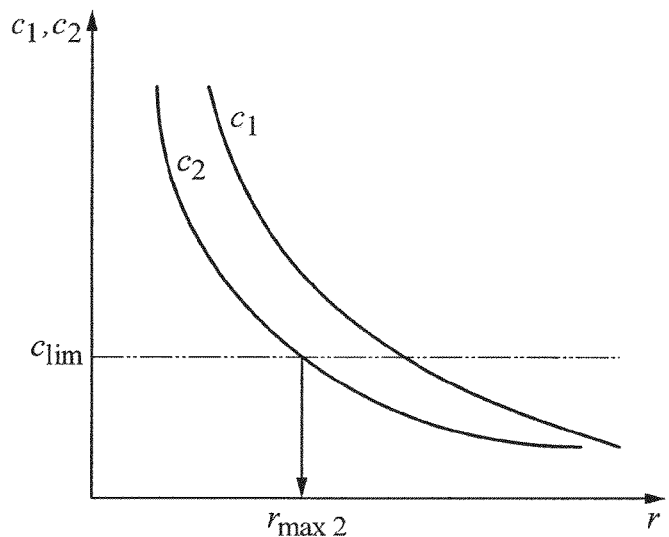
FIG. 17 is a view illustrating the relationship between a maximum size $r_{max2}$ capable of being caged and distances $c_1$, $c_2$, and $c_{lim}$, related to the present embodiment.

FIG. 17 is a view illustrating the relationship between the maximum size $r_{max2}$ capable of being caged and the distances $c_1$, $c_2$, and $c_{lim}$, related to the present embodiment. In FIG. 17, the vertical axis is the length of the distances $c_1$, $c_2$, and $c_{lim}$, and the horizontal axis is the radius of the part M. As shown in FIG. 17, as the maximum size $r_{max2}$ capable of being caged, a smaller value of r of intersections between a curved line with the distance $c_1$ or $c_2$ and the minimum value $c_{lim}$ is selected. For example, if $c_{12}$ is selected in the case classification of Formula (6) and $c_{21}$ is selected in the selection of Formula (15), a smaller value of r of intersections between a curved line with the distance $c_{12}$ or $c_{21}$ and the minimum value $c_{lim}$ is selected as the maximum size $r_{max2}$ capable of being caged.

Additionally, the minimum value $c_{lim}$ is an allowed positional error. The allowed positional error is a range (caging region S) where the part M can move freely in a state where caging is established. For example, if the minimum value is $c_{lim}=2.0$ [mm], the distance $c_1$ or $c_2$ becomes 2.0 [mm].

This value means that a part M of $r_{max2}$ can be caged if the recognition error of a camera, the positioning error of the grip portion 10A, or the like are within a range of a region S to be formed with $c_1$ and $c_2$ of 2.0 [mm], for example, in a case where an object is recognized with the camera and the object is gripped by the grip portion 10A.

Self-Alignment Conditions

Next, a method of calculating the maximum size of a part M in which self-alignment is possible, using the grip claw design device, will be described.

Figure 18A:
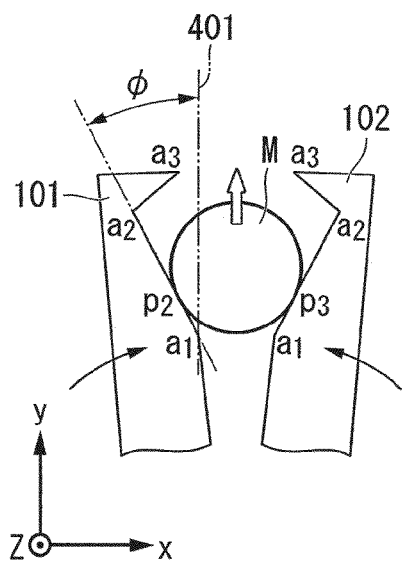
FIGS. 18A and 18B are views illustrating the conditions of self-alignment related to the present embodiment.
Figure 18B:
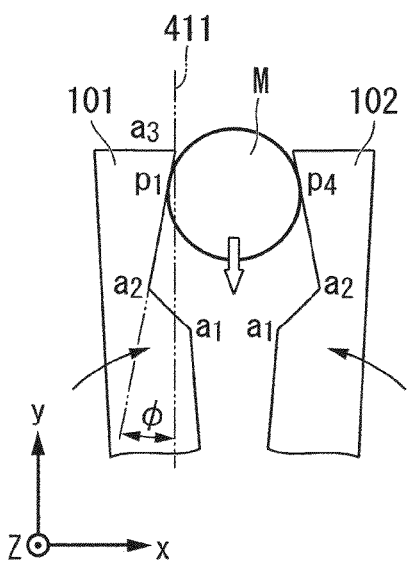

FIGS. 18A and 18B are views illustrating the conditions of self-alignment related to the present embodiment. As shown in FIG. 18A, the part M comes in contact with the contact points $p_2$ and $p_3$ of the second inclined surfaces 121 and 122 of the grip claws 101 and 102. In this state, if the grip claws 101 and 102 move in directions in which the grip claws approach each other, the part M is moved in the positive direction in the y direction. Thereby, self-alignment is performed (also referred to as upward self-alignment). Additionally, in FIG. 18A, a symbol ϕ represents an angle made between the line segment $a_1a_2$ of the grip claw 101 and a line segment 401 having the apex $a_1$ as a starting point and parallel to the y direction.

Additionally, as shown in FIG. 18B, the part M comes in contact with the contact points $p_1$ and $p_4$ of the first inclined surfaces 111 and 112 of the grip claws 101 and 102. In this state, if the grip claws 101 and 102 move in directions in which the grip claws approach each other, that is, the grip claws 101 and 102 are closed the part M is moved in the negative direction in the y direction. Thereby, self-alignment is performed (also referred to as downward self-alignment). Additionally, in FIG. 18B, a symbol ϕ represents an angle made between the line segment $a_3a_2$ of the grip claw 101 and a line segment 411 having the apex $a_3$ as a starting point and parallel to the y direction. This angle ϕ is the contact angle between the grip claw 101 and the part M.

Figure 20:
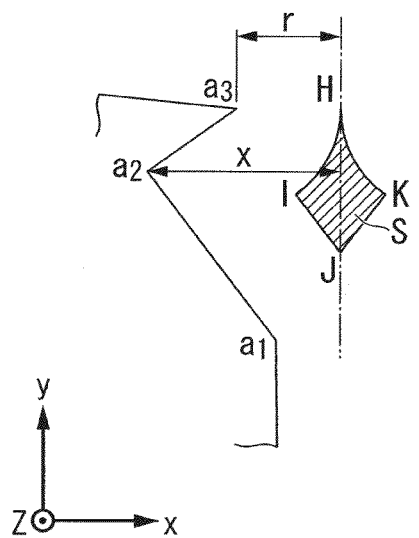
FIG. 20 is a view illustrating the relationship between r and an apex $a_2$ related to the present embodiment.

FIGS. 19A and 19B are views illustrating a force applied to a part from the grip claws related to the present embodiment. FIG. 19A, similarly to FIG. 18A, is a view illustrating a force applied to a part from the grip claws during the upward self-alignment. FIG. 19B, similarly to FIG. 18B, is a view illustrating a force applied to a part from the grip claws during the downward self-alignment. Additionally, in FIG. 19B, a symbol xb is the distance from the apex $a_3$ of the grip claw 101 to a line segment 421 passing through the central point o of the part M. FIG. 20 is a view illustrating the relationship between r and the apex $a_2$ related to the present embodiment.

As shown in FIGS. 19A and 19B, when a force F applied to the part M from the grip claws 101 and 102 is resolved into a force fs in a grip claw direction (in the direction of the line segment $a_2a_2$ or the line segment $a_3a_2$), and a force fx in the x direction, this force is expressed like the following Formula (29).

$$\begin{cases} f_s = F\tan\phi \\ f_x = \dfrac{F}{\cos\phi} \end{cases} \quad (29)$$

Additionally, if a frictional coefficient is defined as μ, frictional force $f_f$ which acts on the part M is expressed like the following Formula (30).

$$f_f = \mu F \quad (30)$$

From Formulas (29) and (30), the conditions that the part M moves by closing the grip claws 101 and 102 are expressed like the following Formula (31).

$$\phi > \tan^{-1}\mu \quad (31)$$

In Formula (31), the following Formula (32) is obtained.

$$\phi_{lim} = \tan^{-1}\mu \quad (32)$$

Next, the self-alignment conditions in the case of the upward self-alignment will be described. As shown in FIG. 19B, the contact angle ϕ is expressed like the following Formula (33).

$$\phi = \beta + \theta \quad (33)$$

Since the contact angle ϕ becomes smaller like Formula (33) as the grip claws 101 and 102 are closed, the part M may stop in the middle of self-alignment in a range where β is less than $(\tan^{-1}\mu)$. For this reason, the minimum size $r_{min2}$ of a part M capable of the upward self-alignment is expressed like the following Formula (34) from the geometric relationship shown in FIG. 19A.

$$r_{min2} = \begin{cases} \dfrac{\left(\dfrac{d\sin\phi_{lim}}{\sin\beta} + l\cos\gamma -\right) \times}{\cos\left(\dfrac{\pi}{2} - \beta + \alpha\right)} \\ \dfrac{\sin\left(\dfrac{\pi}{2} - \beta + \alpha\right)}{\cos\left(\dfrac{\pi}{2} - \beta + \alpha - \left(\dfrac{\pi}{2} - \phi_{lim}\right)\right)}, \text{ if } \beta \le \phi_{lim} \\ 0, \text{ if } \beta > \phi_{lim} \end{cases} \quad (34)$$

If Formula (33) is substituted in Formula (34), the following Formula (35) is obtained.

$$r_{min2} = \begin{cases} \dfrac{\left(\dfrac{d\sin(\beta+\theta)}{\sin\beta} + l\cos\gamma -\right) \times}{l\cos(\theta+\gamma)} \\ \dfrac{\sin\left(\dfrac{\pi}{2} - \beta + \alpha\right)}{\cos\left(\dfrac{\pi}{2} - \beta + \alpha - \left(\dfrac{\pi}{2} - (\beta+\theta)\right)\right)}, \text{ if } \beta \le \phi_{lim} \\ 0, \text{ if } \beta > \phi_{lim} \end{cases} \quad (35)$$

Next, the self-alignment conditions in the case of the downward self-alignment will be described. As shown in FIG. 19B, the contact angle ϕ is expressed like the following Formula (36)

$$\phi = \dfrac{\pi}{2} - \alpha - \theta. \quad (36)$$

Since the contact angle ϕ becomes greater like Formula (36) as the grip claws 101 and 102 are closed, self-alignment is possible when the grip claws 101 and 102 are opened most in a range where $(\pi/2-\alpha)$ is equal to or more than $(\tan^{-1}\mu)$. For this reason, the maximum size $r_{max3}$ of a part M capable of the downward self-alignment is expressed like the following Formula (37) from the geometric relationship shown in FIG. 19B.

$$r_{max3} = \begin{cases} 0, \text{ if } \frac{\pi}{2} - \alpha < \phi_{lim} \\ \frac{\left(d\tan\alpha + \frac{d}{\tan\beta}\right)\cos(\alpha + \phi_{lim})}{\cos\phi_{lim}} + \\ \frac{l\cos\gamma - l\sin(\alpha + \phi_{lim} - \gamma)}{\cos\phi_{lim}}, \text{ if } \frac{\pi}{2} - \alpha \geq \phi_{lim} \end{cases} \quad (37)$$

If Formula (36) is substituted in Formula (37), the following Formula (38) is obtained.

$$r_{max3} = \begin{cases} 0, \text{ if } \frac{\pi}{2} - \alpha < \phi_{lim} \\ \frac{\left(d\tan\alpha + \frac{d}{\tan\beta}\right)\cos(\frac{\pi}{2} - \theta)}{\cos(\frac{\pi}{2} - \alpha - \theta)} + \\ \frac{l\cos\gamma - l\sin(\frac{\pi}{2} - \theta - \gamma)}{\cos(\frac{\pi}{2} - \alpha - \theta)}, \text{ if } \frac{\pi}{2} - \alpha \geq \phi_{lim} \end{cases} \quad (38)$$

As described above, in Step S2, the grip claw design device calculates the maximum size $r_{max2}$ of a part M capable of being caged, from Formulas (6) and (15) on the basis of the caging conditions. Moreover, on the basis of the self-alignment conditions, the grip claw design device calculates the minimum size $r_{min2}$ of a part M capable of the upward self-alignment from Formula (35), and calculates the maximum size $r_{max3}$ of a part M capable of the downward self-alignment from Formula (38).

The description of the operation performed in Step S2 is ended above.

Conditions Capable of Assembling Target Part

Next, the processing performed in Step S3 will be described in detail. In Step S3, the conditions used when taking into consideration a case where the part M is assembled will be described.

Figure 21B:
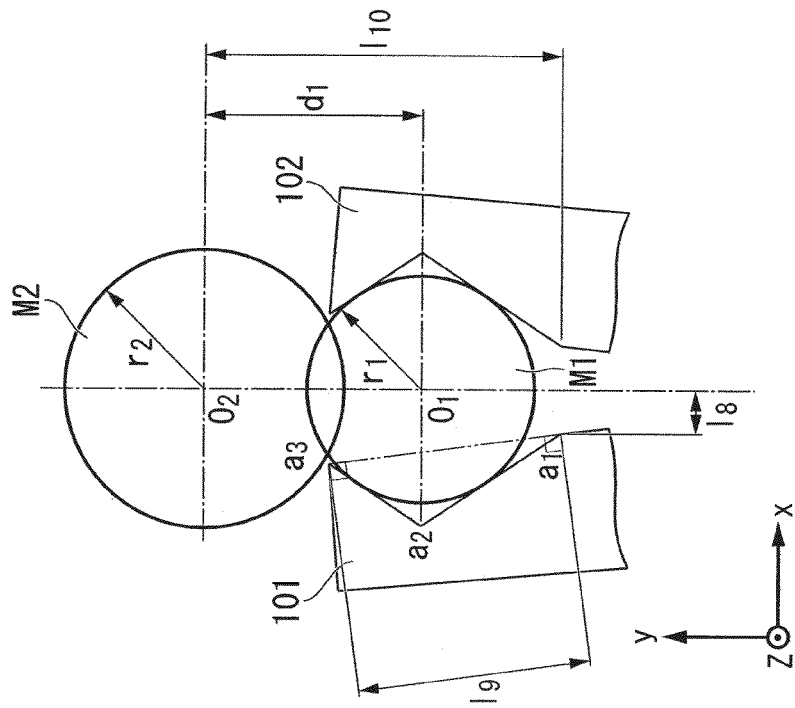
FIGS. 21A and 21B are views illustrating the conditions used in a case where a part M related to the present embodiment is attached.
Figure 21A:
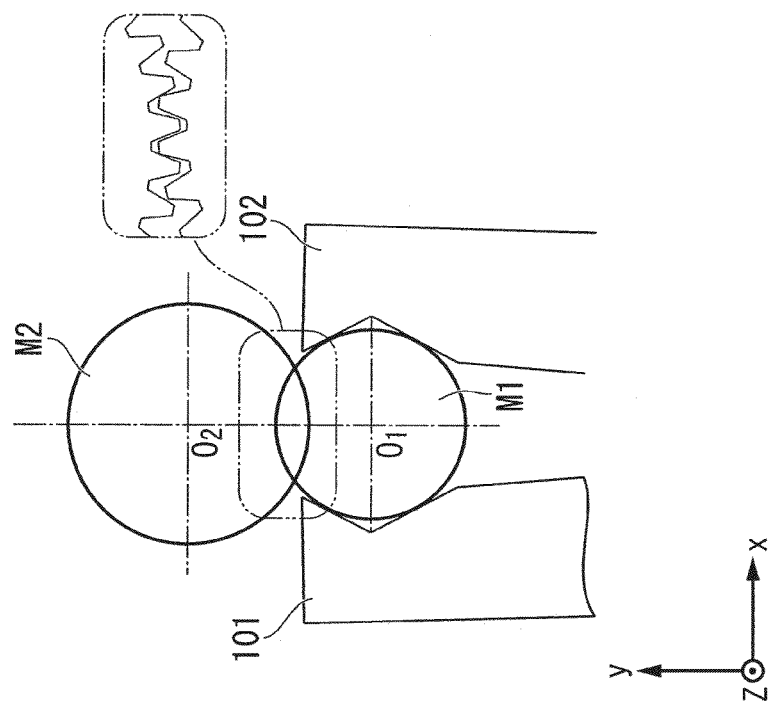

FIGS. 21A and 21B are views illustrating the conditions used in a case where the part M related to the present embodiment is attached. As shown in FIG. 21A, the grip claws 101 and 102 attach a gripped part M1 such that the teeth of a part M2 which is an attachment destination is combined with the teeth of the gripped part. That is, the parts M1 and M2 are, for example, gears having teeth. FIG. 21B is a view illustrating the conditions that the grip claw tips are capable of assembling without interference with the part M2. Additionally, FIG. 22 is a view illustrating an example in which grip claw tips related to the present embodiment interfere with the part M2.

In FIG. 21B, a symbol $o_1$ is the central point of the part M1, and a symbol $o_2$ is the central point of the part M2. Additionally, a symbol $l_8$ represents the distance in the x direction between the apex $a_1$ of the triangle $a_1 a_2 a_3$ of the grip claw 101 and the central point $o_1$ of the part M1, a symbol $l_9$ represents the distance between the apex $a_1$ and the apex $a_3$ of the grip claw 101, and a symbol $l_{10}$ represents a y component of the distance between the central point $o_2$ of the part M2, and the apex $a_1$ of the grip claw 101.

Figure 22:
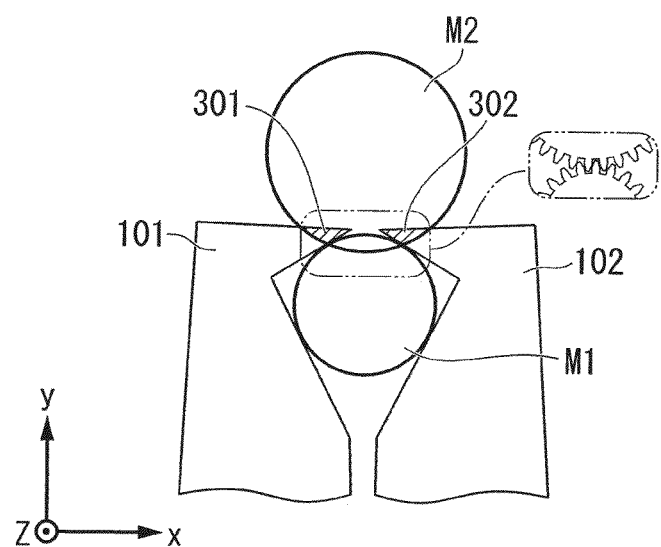
FIG. 22 is a view illustrating an example in which grip claw tips related to the present embodiment interfere with a part M2 to be attached.

As shown in FIG. 22, in a case where the grip claws 101 and 102 attach the part M1 as a gear to the part M2 as a gear, if the grip claw tips have a shape so as to wrap the part M1 too much, the other gear and claw tips interfere with each other.

That is, the grip claws 101 and 102 need to satisfy the following Formula (39) as the conditions capable of performing assembling without interference.

$$\sqrt{(l_8+l_9\sin\theta)^2 + (l_{10}-l_9\cos\theta)^2} \geq r_2 \quad (39)$$

In addition, in Formula (39), the distances $l_8$, $l_9$, and $l_{10}$ satisfy the following Formulas (40) to (42).

$$l_8 = l\cos\gamma - l\cos(\gamma + \theta) \quad (40)$$

$$l_9 = d\tan\alpha + \frac{d}{\tan\beta} \quad (41)$$

$$l_{10} = d_1 + \frac{d\cos(\beta + \theta)}{\sin\beta} - \frac{r_1 \sin\left(\frac{\frac{\pi}{2} - \beta - \alpha}{2} - \theta\right)}{\sin\left(\frac{\frac{\pi}{2} - \beta + \alpha}{2}\right)} \quad (42)$$

In addition, in Formula (42), as shown in FIG. 21B, $r_1$ represents the radius of the gear to be gripped, $r_2$ represents the radius of the gear which is an assembling mate, and $d_1$ represents the distance between the centers of the gears.

As described above, in Step S3, the grip claw design device calculates the conditions of the grip claws 101 and 102 according to Formula (39) on the basis of the conditions capable of assembling a part.

In addition, Step S3 needs to be taken into consideration when the gears as shown in FIG. 21A are attached to each other. However, Step S3 may not be taken into consideration in a case where a gripped part M is attached to a shaft. In this case, the operation processing of Step S3 may not be performed.

In addition, although the example in which the conditions that do not interfere with the part M2 which is an attachment destination has been described in the present embodiment, the portion in which the grip claws 101 and 102 interfere with the part M2 may be removed according to the size of a part M to be gripped. Even in this case, an interference portion is removed so as to fulfill the aforementioned frictional grip conditions, self-alignment conditions, and caging conditions.

The description of the operation performed in Step S3 is ended above.

Next, the processing performed in Step S4 will be described in detail. In Step S4, the claw tip shape of the grip claws 101 and 102 is calculated using the results calculated in Steps S1 to S3.

The grip claw design device calculates the minimum size $r_{min}$ of a part M capable of being gripped and the maximum size $r_{max}$ capable of being gripped in a claw tip shape according to the following Formulas (43) and (44), using the allowable positional error $c_{lim}$ and the frictional coefficient $\mu$.

$$r_{min} = \max\{r_{min1}, r_{min2}\} \quad (43)$$

$$r_{max} = \min\{r_{max1}, r_{max2}, r_{max3}\} \quad (44)$$

That is, the grip claw design device selects a greater value of the minimum size $r_{min1}$ of the part M capable of frictional grip and the minimum size $r_{min2}$ of the part M capable of self-alignment from the distal end to the proximal end, as the minimum size $r_{min}$ of the part M according to Formula (43). Additionally, the grip claw design device selects a smallest value among the maximum size $r_{max1}$ of the part M capable of frictional grip, the maximum size $r_{max2}$ of the part M in which a region where the center of the part M is movable becomes the greatest, and the maximum size $r_{max3}$ of the part M capable of self-alignment from the distal end to a proximal end, as the maximum size $r_{max}$ of the part M according to Formula (44). The minimum size $r_{min}$ of the part M and the maximum size $r_{max}$ of the part M which are selected in this way are within a range of the size of the part M capable of being gripped by the grip claws 101 and 102.

In addition, the distal end portions of the grip claws 101 and 102 do not necessarily show only the ends in the strict meaning, but also include side surfaces on the side of distal ends including a straight line passing through the point $a_1$ and the point $a_3$, or locations similar thereto, as shown in FIG. 3A. Similarly, the base portions of the grip claws 101 and 102 do not necessarily show only the ends in the strict meaning, but also include side surfaces on the side of rear ends including a straight line passing through the point $a_1$ and the point $a_3$, or a location similar thereto, as shown in FIG. 3A.

Additionally, although the formulas in the present specification are shown on the premise that the object is circular, these formulas are satisfactorily established by treating even a gear as a circumscribed circle.

Next, a specific design example of the grip claws 101 and 102 will be described.

FIGS. 23A to 23D are views showing examples of the results when the minimum size $r_{min}$ of the part M related to the present embodiment is calculated. As shown in FIG. 23A to 23D, the grip claw design device calculates the minimum size $r_{min}$ of the part M, for example, with respect to d of all the range of $0 \le d \le 7$, and calculates the values of $\alpha$ and $\beta$ within a range of respective values of Formula (1) ($\alpha$ and $\beta$ are within ranges of $0 < \alpha < 90$ [deg] and $0 < \beta < 90$ [deg], respectively) for every value of d according to Formula (43). FIGS. 23A to 23D show the calculation results of the values of respective $\alpha$ and $\beta$ when d=1.0 [mm], d=3.0 [mm], d=5.0 [mm], and d=7.0 [mm]. In FIGS. 23A to 23D, the horizontal axis is the angle of $\alpha$, and the vertical axis is the angle of $\beta$.

Additionally, FIGS. 24A to 24D are views showing examples of the results when the maximum size $r_{max}$ of the part M related to the present embodiment is calculated. As shown in FIG. 24A to 24D, the grip claw design device calculates the maximum size $r_{max}$ of the part M, for example, with respect to d of all the range of $0 \le d \le 7$, and calculates the values of $\alpha$ and $\beta$ within a range of respective values of Formula (1) ($\alpha$ and $\beta$ are within ranges of $0 < \alpha < 90$ [deg] and $0 < \beta < 90$ [deg], respectively) for every value of d according to Formula (44). FIGS. 24A to 24D show the calculation results of the values of respective $\alpha$ and $\beta$ when d=1.0 [mm], d=3.0 [mm], d=5.0 [mm], and d=7.0 [mm]. In FIGS. 24A to 24D, the horizontal axis is the angle of $\alpha$, and the vertical axis is the angle of $\beta$.

Here, the calculation is performed when the minimum value of allowable positional error is $c_{lim}$=2.0 [mm] and the frictional coefficient is $\mu$=0.15.

In FIGS. 23A to 23D, darker ranges of the graphs represent claw tips which can grip a smaller part. As shown in FIGS. 23A to 23D, it can be understood that, as the values of d and $\alpha$ are smaller and the value of $\beta$ is greater, a smaller part can be gripped. Additionally, in FIGS. 24A to 24D, brighter ranges of the graphs represent claw tips which can grip a larger part. As shown in FIGS. 24A to 24D, it can be understood that, as the values of d and $\alpha$ are greater and the value of $\beta$ is smaller, a larger part can be gripped. Here, the self-alignment of a part cannot be performed in a range where $\alpha$ is near $\pi/2$.

FIGS. 25A and 25B are views showing examples of the calculation results of the values of $\alpha$ and $\beta$ in a case where d related to the present embodiment is 4.1 mm. FIG. 25A shows the operation result of the minimum size $r_{min}$ of the part M when d is 4.1 mm, and FIG. 25B shows the operation result of the maximum size $r_{max}$ of the part M when d is 4.1 mm. The grip claw design device performs setting to d=4.1 mm, and calculates $\alpha$=61.8 [deg] and $\beta$=18.4 [deg] from FIGS. 25A and 25B which are operation results of the maximum size and minimum size of a part capable of being gripped.

Figure 26B:
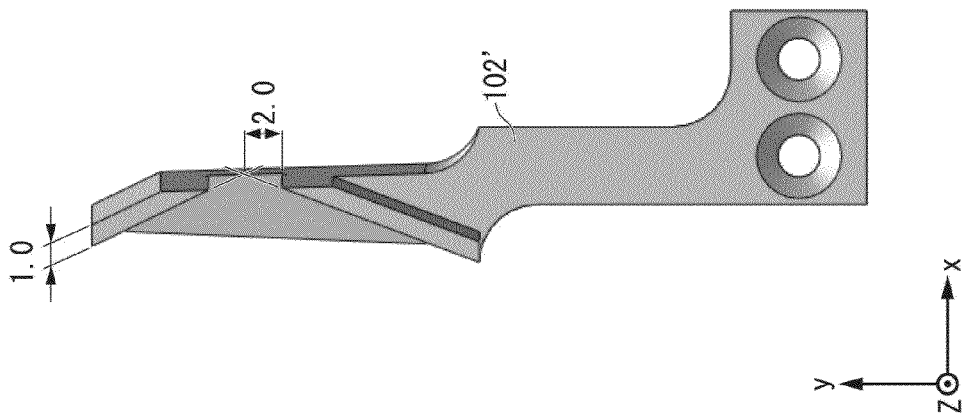
FIGS. 26A and 26B are views illustrating a design example of the grip claw related to the present embodiment.
Figure 26A:
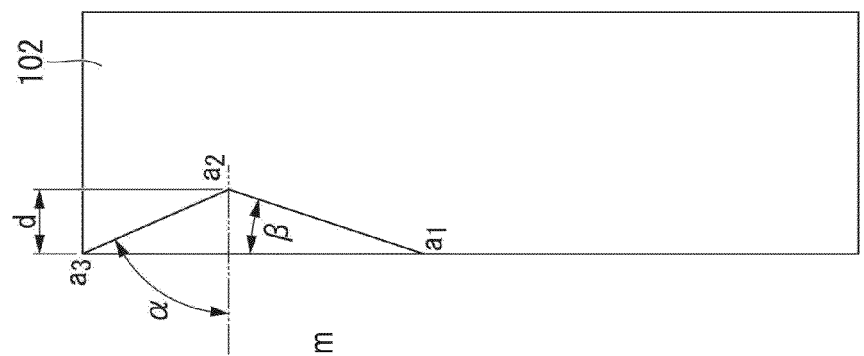

FIGS. 26A and 26B are views illustrating a design example of a grip claw obtained by the operation result related to the present embodiment.

FIG. 26A shows an example of the grip claw 102 calculated according to Formulas (43) and (44). As described above, the parameters of the claw tip shape are d=4.1 [mm], $\alpha$=61.8 [deg], and $\beta$=18.4 [deg]. The range of the diameter of a part M capable of being gripped by this grip claw is 9.3 [mm] to 33.5 [mm].

That is, the robot 1 having the grip claw of such parameters can grip a part whose diameter is within a range of 9.3 [mm] to 33.5 [mm].

Additionally, as shown in FIG. 26B, a grip claw 102' is obtained by removing portions which are unnecessary when gripping the part M from the grip claw 102 shown in FIG. 26A. Thus, unnecessary portions may be removed from the shape of the grip claws 101 and 102 when gripping the part M.

FIGS. 27A and 27B are views illustrating another design example of a grip claw related to the present embodiment. FIG. 27A is a perspective view of a grip claw, and FIG. 27B is a three-side view of the grip claw.

As shown in FIGS. 27A and 27B, the grip claw 102' includes a rib 501 at a location equivalent to the first inclined surface 111 and a rib 502 at a location equivalent to the second inclined surface 121. As shown in the side view of FIG. 27B, the height of the rib 501 and the rib 502 is d1. That is, the rib 501 and the rib 502 are formed in a convex shape by the height d1 on a surface 510 of the grip claw 102'. The rib 501 is a first inclined surface (distal-end-side surface), and the rib 502 is a second inclined surface (proximal-end-side surface).

Since the grip claw 102' includes the ribs 501 and 502 in this way, even if portions which are unnecessary when gripping the part M are removed from the claw tip shape of FIG. 26A it is possible to grip the part M. The first inclined surface (distal-end-side surface) and the second inclined surface (proximal-end-side surface) do not need to be continuous. Additionally, the ribs 501 and 502 also have an effect that the ribs cage the part M in a z-axis direction (particularly, the positive direction).

In addition, although the example in which the grip claws grip a part and transport or assemble the part to the second object has been described in the present embodiment, for example, the part may be attached using an image captured by the camera provided on the arm. The camera may capture an image of the part or the second object and recognize an attachment position on the basis of the captured image through the control of the control device 60. Then, the control device may perform a control so as to move the part to the attachment position of the second object on the basis of the recognized result.

As described above, a shape in which the range of the size of the diameter of a part capable of being gripped by a hand capable of gripping a small and lightweight part becomes widest can be obtained by designing grip claws. Additionally, since a robot has the grip claws designed in this way, a small and lightweight part can be gripped, and the range of the size of a part capable of being gripped can be widen. Additionally since the range of the size of a part capable of being gripped is wide, it becomes unnecessary to replace grip claws to be mounted on a robot for every part, and the robot can grip a broad size of parts.

In addition, although the example applied to an assembling robot including the grip claws 101 and 102 has been described in the present embodiment, for example, the robot 1 of the present embodiment may be applied to a transporting device or the like. Additionally, although the example in which an object is gripped and transported or assembled has been described in the present embodiment, for example, predetermined actions, such as disassembling or inspection of an object, may be performed.

In addition, a program for realizing the functions of the control section of FIG. 1 of the embodiment and the functions of the respective portions of the grip claw design device (not shown) may be recorded on a computer readable recording medium, and the program recorded on this recording medium may be made to be read and executed in a computer system so as to perform processing of the respective portions. In addition, the term "computer system" here includes OS or hardware, such as a peripheral device.

Additionally, if the "computer system" is a case where the WWW system is used, the computer system also includes a website-providing environment (or a display environment).

Additionally, the term "computer readable recording medium" includes portable media, such as a flexible disk, a magnetic optical disc, a ROM (Read Only Memory), and a CD-ROM a USB memory connected via an USB (Universal Serial Bus) I/F (interface), and storage devices such as a hard disk built in the computer system. Moreover, the term "computer readable recording medium" includes a medium which keeps a program for a given time, like a volatile memory inside the computer system which becomes a server or a client. Moreover, the above program may be provided to realize some of the aforementioned functions, and may be provided to realize the aforementioned functions in combination with a program already recorded on the computer system.

The entire disclosure of Japanese Patent Application No. 2010-285076, filed Dec. 21, 2010 is expressly incorporated by reference herein.

What is claimed is:

1. A robot comprising:
two claw portions that face each other to grip an object therebetween,
wherein each of the two claw portions comprises:
a base plate in which a base surface is parallel to a moving direction of the two claw portions with respect to a rocking axis;
a first rib that is formed on the base plate at a proximal end, that has a proximal-end-side surface to grip the object, and that projects in a normal direction from the base surface;
a second rib that is formed on the base plate at a distal end, that has a distal-end-side surface to grip the object, and that projects in the normal direction from the base surface;
a recess that is configured with the proximal-end-side surface and the distal-end-side surface; and
the base plate is formed between the proximal-end-side surface and the distal-end-side surface,
when each of the two claw portions is seen in the normal direction:
a point where a first straight line including the proximal-end-side surface intersects a second straight line including the distal-end-side surface is a base point,
a line that passes through a proximal edge of the first rib and a distal edge of the second rib is an orthogonal line, and
a line that passes through the base point and that is orthogonal to the orthogonal line is a base line,
an angle $\alpha$ of a corner made between the base line and the second straight line is greater than 0 degrees and less than 90 degrees,
an angle $\beta$ of a corner made between the orthogonal line and the first straight line is greater than 0 degrees and less than 90 degrees, and
a distance d between the base point and the orthogonal line along with the base line is greater than 0.

2. The robot according to claim 1,
wherein, when each of the two claw portions is seen in the normal direction,
the recess is formed in such a relationship that the difference between the minimum value and maximum value of the radius r of the object is the maximum on the basis of the angle $\alpha$, the angle $\beta$, and the length d.

3. The robot according to claim 1,
wherein, when each of the two claw portions is seen in the normal direction,
the recess is formed in such a relationship that the difference between the minimum value and maximum value of the radius r of the object is the maximum, on the basis of
a length l from the rocking axis to the proximal edge of the first rib,
an angle $\gamma$ of a corner made between the base line and a third straight line passing through the rocking axis and the proximal edge of the first rib when each of the two claw portions is closed, and
an angle $\theta$ of a corner made between a fourth straight line passing through the rocking axis and the proximal edge of the first rib when each of the two claw portions is opened and the third straight line.

4. The robot according to claim 1,
wherein, when the length d and the angles $\alpha$ and $\beta$ are determined to be predetermined values, as the conditions of the object capable of being gripped,
the minimum value $r_{min}$ of the radius of the object capable of being gripped which is a value of any greater radius is determined from
the minimum value $r_{min1}$ of the radius of the object capable of being gripped in contact with the proximal-end-side surface and distal-end-side surface of each of the two claw portions when the object is gripped at four points, and
the minimum value $r_{min2}$ of the radius of the object capable of being gripped in contact with the proximal-end-side surface and distal-end-side surface of each of the two claw portions as the object deviates due to the rocking of each of the claw portions even if the object comes in contact with only the distal-end-side surface of the recess of each of the claw portions when the object is gripped by each of the claw portions, and
wherein the recess is formed in the relationship between the length d and angles $\alpha$ and $\beta$, and the minimum value $r_{min}$ of the radius of the object.

5. The robot according to claim 1,
wherein, when the length d and the angles $\alpha$ and $\beta$ are determined to be predetermined values, as the conditions of the object capable of being gripped,
the maximum value $r_{max}$ of the radius of the object which is a value of the smallest radius is determined from
the maximum value $r_{max1}$ of the radius of the object capable of being gripped in contact with the proximal-end-side surface and distal-end-side surface of each of the two claw portions when the object is gripped at four points, the maximum value $r_{max2}$ of the radius of the object in which the object is movable without being constrained by the proximal-end-side surface and distal-end-side surface of recess of each of the two claw portions, and a region where the center of the object is movable is the maximum when the object is gripped at four points, and the maximum value $r_{max3}$ of the radius of the object capable of being gripped in contact with the proximal-end-side surface and distal-end-side surface of each of the two claw portions as the object deviates due to the rocking of each of the two claw portions even if the object comes in contact with only the proximal-end-side surface of the recess of each of the two claw portions when the object is gripped by each of the claw portions, and wherein the shape of the recess is formed in the relationship between the length d and angles $\alpha$ and $\beta$, and the maximum value $r_{max}$ of the radius of the object.

6. The robot according to claim 5, wherein the recess is formed such that the relationship between the minimum value $r_{min1}$ of the radius of the object, and the length d, and angles $\alpha$ and $\beta$ satisfy the following formula:

$$r_{min1} = \frac{d\cos(\alpha - \beta)}{\cos\alpha + \sin\beta}$$

the relationship between the minimum value $r_{min2}$ of the radius of the object, and the lengths d and a length l, and angles $\alpha$, $\beta$, $\beta$, and $\theta$ satisfies the following formula, where the length l is between the rocking axis and the proximal edge of the first rib:

$$r_{min2} = \left(\frac{d\sin(\beta + \theta)}{\sin\beta} + l\cos\gamma - l\cos(\theta + \gamma)\right) \times \frac{\sin\left(\frac{\frac{\pi}{2} - \beta + \alpha}{2}\right)}{\cos\left(\frac{\frac{\pi}{2} - \beta + \alpha}{2} - \left(\frac{\pi}{2} - (\beta + \theta)\right)\right)}$$

where the minimum value $r_{min2}$ of the radius of the object is 0 when $\phi_{lim}$ is smaller than $\beta$, the relationship between the maximum value $r_{max1}$ of the radius of the object, and the lengths d and l, and angles $\alpha$, $\beta$, and $\gamma$ satisfies the smaller one of the following formula:

$$r_{max11} = \frac{d}{\sin\beta}\cos(\alpha - \beta) + l\cos\gamma + l\sin(\gamma - \alpha)$$

and the following formula:

$$r_{max12} = \frac{d}{\cos\alpha}\tan\left(\frac{\frac{\pi}{2} - \beta + \alpha}{2}\right)$$

where the following formula is satisfied when $\alpha$ is equal to or more than $\pi/2 - \beta$:

$$r_{max12} = \frac{d}{\sin\beta}\tan\left(\frac{\frac{\pi}{2} - \beta + \alpha}{2}\right)$$

$r_{max2}$ obtained through numerical calculation from the following formulas:

$$c_1 \begin{cases} c_{11}, \text{ if } l_1 < r\cos(\beta + \theta) \\ c_{12}, \text{ if } l_1 \geq r\cos(\beta + \theta) \end{cases} \tag{6}$$

$$c_2 = \begin{cases} c_{21}, \text{ if } (l_4 \geq 0 \wedge l_5 \geq 0) \\ c_{22}, \text{ if } (l_4 < 0 \wedge l_5 \geq 0) \vee \\ \quad ((l_4 < 0 \wedge l_5 < 0) \wedge (l_6 < r \wedge l_7 \geq r)) \\ c_{23}, \text{ if } (l_4 \geq 0 \wedge l_5 < 0) \vee \\ \quad ((l_4 < 0 \wedge l_5 < 0) \wedge (l_6 \geq r \wedge l_7 < r)) \\ c_{24}, \text{ if } (l_4 < 0 \wedge l_5 < 0) \wedge \\ \quad ((l_6 \geq r \wedge l_7 \geq r) \vee (l_6 < r \wedge l_7 < r)) \end{cases} \tag{15}$$

the relationship between the maximum value $r_{max3}$ of the radius of the object, and the length d, and angles $\alpha$ and $\beta$ satisfies the following formula:

$$r_{max3} = \frac{\left(d\tan\alpha + \frac{d}{\tan\beta}\right)\cos\left(\frac{\pi}{2} - \theta\right)}{\cos\left(\frac{\pi}{2} - \alpha - \theta\right)} + \frac{l\cos\gamma - l\sin\left(\frac{\pi}{2} - \theta - \gamma\right)}{\cos\left(\frac{\pi}{2} - \alpha - \theta\right)}$$

where $r_{max3}$ is 0 (here, $\phi_{lim}$ is $\beta + \theta$) when $\phi_{lim}$ is greater than $\pi/2 - \alpha$.

7. The robot according to claim 1, wherein, when the object is gripped at four points so as to come in contact with the proximal-end-side surface and distal-end-side surface of each of the two claw portions, the recess is formed in such a relationship that the centerline of the object is present between a first line connecting a first contact point between the distal-end-side surface of one of the two claw portions, and the object, and a second contact point between the distal-end-side surface of the other of the two claw portions, and the object, and a second line connecting a third contact point between the proximal-end-side surface of one of the two claw portions, and the object, and a fourth contact point between the proximal-end-side surface of the other of the two claw portions, and the object.

8. The robot according to claim 1, wherein a shape of the recess is determined according to an area in which the object is placed.

9. The robot according to claim 1, wherein each of the two claw portions is formed so as not to interfere with a part which is a target to which the object is assembled.

10. The robot according to claim 1, wherein the object includes a columnar shape.

11. The robot according to claim 1, wherein the object includes a gear-like shape.

12. The robot according to claim 1, wherein when each of the two claw portions is seen in the normal direction, the first and second ribs are in an inverted truncated V-shape.

13. A hand for a robot comprising:

two claw portions that face each other to grip an object therebetween, wherein each of the two claw portions comprises:

- a base plate in which a base surface is parallel to a moving direction of the two claw portions with respect to a rocking axis;
- a first rib that is formed on the base plate at a proximal end, that has a proximal-end-side surface to grip the object, and that projects in a normal direction from the base surface;
- a second rib that is formed on the base plate at a distal end, that has a distal-end-side surface to grip the object, and that projects in the normal direction from the base surface;
- a recess that is configured with the proximal-end-side surface and the distal-end-side surface; and
- the base plate is formed between the proximal-end-side surface and the distal-end-side surface, when each of the two claw portions is seen in the normal direction:

- a point where a first straight line including the proximal-end-side surface intersects a second straight line including the distal-end-side surface is a base point,
- a line that passes through a proximal edge of the first rib and a distal edge of the second rib is an orthogonal line, and
- a line that passes through the base point and that is orthogonal to the orthogonal line is a base line, an angle $\alpha$ of a corner made between the base line and the second straight line is greater than 0 degrees and less than 90 degrees, an angle $\beta$ of a corner made between the orthogonal line and the first straight line is greater than 0 degrees and less than 90 degrees, and a distance d between the base point and the orthogonal line along with the base line is greater than 0.

14. The hand for a robot according to claim 13, wherein when each of the two claw portions is seen in the normal direction, the first and second ribs are in an inverted truncated V-shape.

* * * * *